(12) United States Patent
Nakano et al.

(10) Patent No.: US 6,574,226 B1
(45) Date of Patent: Jun. 3, 2003

(54) DATA TRANSMITTING METHOD

(75) Inventors: Masatomo Nakano, Tokyo (JP); Hisakazu Tsuboya, Kawasaki (JP); Hiroshi Nakamura, Tokyo (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/125,960

(22) PCT Filed: Dec. 25, 1997

(86) PCT No.: PCT/JP97/04833
§ 371 (c)(1),
(2), (4) Date: Feb. 14, 2000

(87) PCT Pub. No.: WO98/29987
PCT Pub. Date: Jul. 9, 1998

(51) Int. Cl.[7] .............................. H04L 12/28; H04J 3/24
(52) U.S. Cl. ................................. 370/395.64; 370/473
(58) Field of Search ..................... 370/395.1, 395.5, 370/395.6, 395.64, 395.65, 466, 469, 473, 434, 394; 714/751, 776, 779, 758

(56) References Cited

U.S. PATENT DOCUMENTS

| | | | | |
|---|---|---|---|---|
| 5,535,221 A | * | 7/1996 | Hijikata et al. | 370/395 |
| 5,878,041 A | * | 3/1999 | Yamanaka et al. | 370/394 |
| 5,930,265 A | * | 7/1999 | Duault et al. | 370/473 |
| 6,005,871 A | * | 12/1999 | Peterson et al. | 370/474 |
| 6,061,820 A | * | 5/2000 | Nakakita et al. | 370/395 |
| 6,108,336 A | * | 8/2000 | Duault et al. | 370/395 |

FOREIGN PATENT DOCUMENTS

| | | |
|---|---|---|
| JP | 6-52884 B2 | 7/1994 |
| JP | 7-30543 A | 1/1995 |
| JP | 7-264192 A | 10/1995 |

OTHER PUBLICATIONS

Eneroth et al, 6/99, IEEE, "Applying ATM/AAL2 as a Switching Technology in $3^{rd}$ Generation Mobile Access Network" pp. 112–122.*
Subbiah et al, 5/98, IEEE ATM Adaption Layer 2 (AAL2) for Low bit rate speech and Data, pp. 225–233.*
ITU–T Recommendation I.363, 4.AAL type 3 (Helsinki, 1993).
1995 Fourth IEEE International Conference on Universal Personal Communications Record (Tokyo, Japan) p. 863–867 H. Nakamura et al. "Using ATM to carry very low bit–rate mobile voice signals" (11/6–10/95).
B314 Masatomo Nakano et al., "Short Cell Multiplexing for Mobile ATM Network" 1996 Communication Society Convention of IEICE (Aug. 30, 1996).

(List continued on next page.)

Primary Examiner—Chau Nguyen
Assistant Examiner—Andy Lee
(74) Attorney, Agent, or Firm—Brinks Hofer Gilson & Lione

(57) ABSTRACT

In a device and method for minimizing transmission delay of low-rate data such as voice data and for enhancing the transmission efficiency in multiplexed data communication using AAL type 2 protocol the SSCS of the high-rate data side of an AAL type 2 converter is responsible for addition and elimination of a dummy code field, error correction, and division and reassembly of data unit. A dummy code field and restorative code field are attached to a user data unit which is supplied from the higher layer in a source device, whereby a data unit is prepared. The data unit is then divided into segments 1 to m of a fixed-length, 45 octets. Successive code fields 1 to m are attached to the segments 1 to m, whereby data blocks 1 to m are prepared. The data blocks 1 to m are successively transferred to the AAL-2 converter. In a destination device, from the data blocks 1 to m, the user data unit is reassembled.

44 Claims, 21 Drawing Sheets

OTHER PUBLICATIONS

B–335 Hajime Tamura et al., "Layered Cell Protocol for The Next Generation Mobile Communications Network" 1996 Annual Meeting of IEICE (Mar. 11, 1996).

SB–12–7 Hiroki Yamada et al., "Study of Clad Functions for ATM Subscriber Access Networks" 1996 Annual Meeting of IEICE (Mar. 11, 1996).

SSE96–25 Takenori Okutani et al., "ATM Cell Assembly Method for Transporting Low Bit Rate Voice" Research Report of IEICE (May 24, 1996).

B–5–208 Shuichi Tsuboya et al., "Data Transmission Over AAL type 2 for Mobile ATM Networks" 1997 Annual Meeting of IEICE (Mar. 6, 1997).

ITU–T Recommendation I.363 (Aug., 1996).

* cited by examiner

FIG. 3
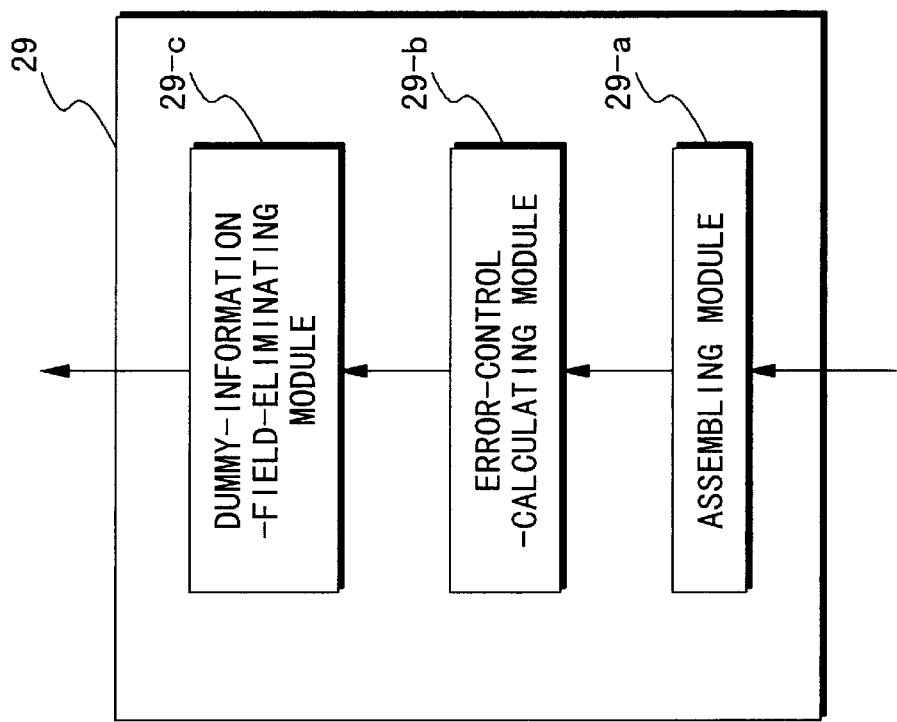
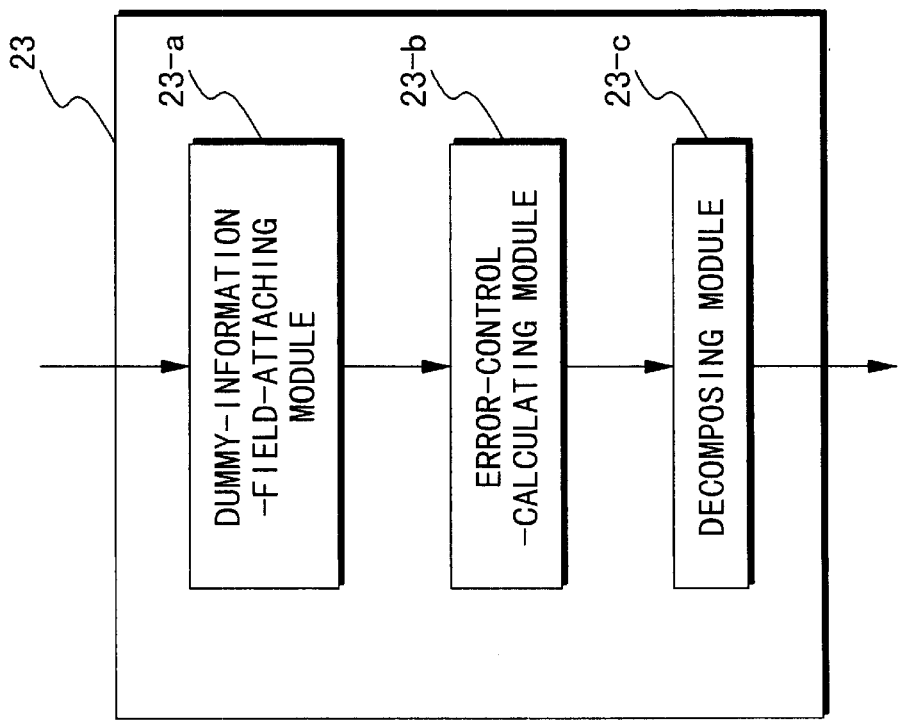

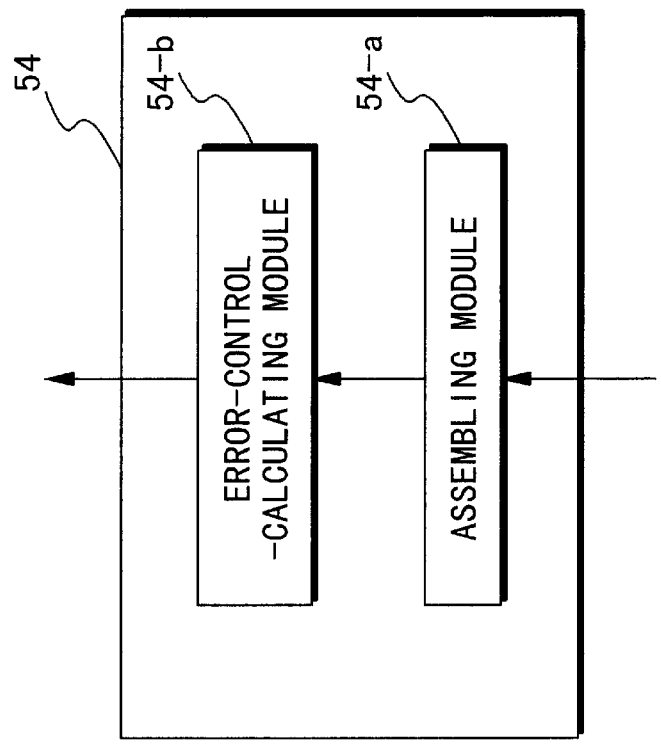
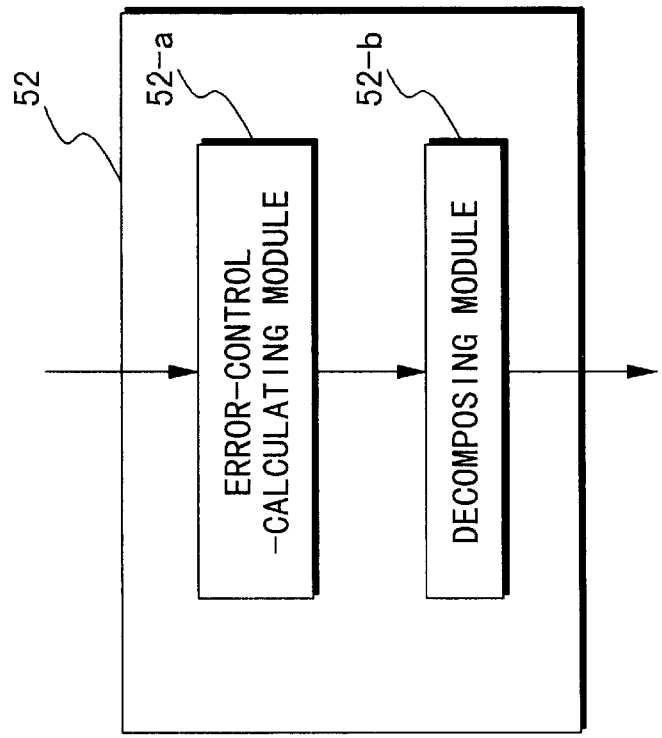
FIG. 6

CODE FORMAT EXAMPLE OF THREE BIT UUI IN CPS PACKET HEADER.

000: SINGLE CPS PACKET ORIGINATED FROM SINGLE APPLICATION FRAME HAVING LENGTH EQUAL TO OR LESS THAN 45 OCTETS 001-011: CPS PACKET ORIGINATED FROM SEGMENT OF APPLICATION FRAME HAVING LENGTH MORE THAN 45 OCTETS

001: TOP
010: MIDDLE
011: END

DATA TRANSMITTING METHOD

TECHNICAL FIELD

The present invention relates to a data communication method for transmitting high-rate data in addition to low-rate data, and to a data transmission processor and a data reception processor for realizing the data communication method. In the following, the low-rate data means low-volumes of data such as voice data, which may be transmitted at a low rate while the high-rate data means high volumes of data, which are preferably transmitted at a high-rate, other than voice data.

TECHNICAL BACKGROUND

Since traffic for not only voice data but also for other data have been rapidly increased in mobile communications, it is an important consideration to establish a large capacity mobile communication network. Moreover, for a mobile multimedia communication in future, it is preferable that communicators can equivalently treat voice data and other data, and therefore multiplex traffic communications capable of equivalently handling the voice data traffic and other data traffic is required. Such a technique is also required for point-to-point communications.

At present, ITU-T (International Telecommunication Union-Telecommunication Standardization Sector) is standardizing the ATM (Asynchronous Transfer Mode) network system for the above-mentioned multiplex traffic communications. As a result, multimedia communications in the ATM networks including both WANs and LANs can be realized. While the ATM network system is standardized, the standardization of the AAL (ATM Adaptation Layer) between the ATM layer and the higher layer is also carried out. Accordingly, the AAL type 2 protocol in accordance with service class B for transmitting coded data, such as coded voice data, at multiple data rate is standardized in order to lower transmission delay and to enhance transmission efficiency.

By the AAL type 2, protocol low-rate data are transmitted through a plurality of channels provided with a single ATM virtual channel. Since mobile communications mainly treat voice traffic which are sent at low and multiple data rates, the AAL types 2 protocol is superior to use in mobile communications. Therefore, it is preferable that the AAL type 2 protocol is quickly introduced into mobile communications.

However, by the AAL type 2 protocol, it is impossible to transmit user data units having a length of 45 octets or more (one octet equals eight bits). Therefore, if it is applied to multimedia communications in which high volumes of data, which should be usually sent at 64 kilo-bits per second or more, in addition to low volumes of data such as voice data, transmission rate of voice data is delayed because of multiplexing with high volumes of data, so that talking quality may be decayed.

Instead, it would be possible to use the AAL type 5 protocol, which has been already standardized for high-rate data transmission. In this case, a statistical multiplex effect can be obtained because cells for voice data and high-rate data are integrally transmitted at the ATM layer and the lower layer. However, the statistical multiplex effect is limited at the ATM layer and the lower layer, and therefore, the transmission delay of voice data is not always prevented.

Therefore, to realize high-rate data transmission with the AAL type 2 protocol, an improvement is proposed, in which the higher and extended sublayer of the AAL type 2 protocol is equivalent to the AAL type 5 protocol (Goran Eneroth at Ericsson, "Segmentation proposal for AAL-CU", ITU-T Study Group 13 Question 6 Madrid rapporteur meeting, November, 1996). FIG. 8 shows usual hierarchical structure, including the AAL type 2, according to B-ISDN (Broadband aspects of ISDN). As shown in FIG. 8, the high-rate data side of AAL type 2 protocol is divided into two sublayers: the upper one is the service specific convergence sublayer (hereafter abbreviated as SSCS), and the lower one is the common part convergence sublayer (hereafter abbreviated as CPS).

By the above-mentioned proposal, the high-rate data side of the layer structure shown in FIG. 8 is modified into the structure shown in FIG. 9A. That is, in the proposed structure, the SSCS is responsible for a function equivalent to the AAL type 5 protocol. Therefore, as shown in FIG. 9A, when a user data unit 1 exceeding a fixed length (45 octets) is transferred to the SSCS of the AAL type 2 protocol from the higher layer, a restorative code field 2 for error detection and a dummy code field 3 of variable length for padding (adjusting the length) are attached to the user data unit 1, whereby a data unit 4 is assembled in accordance with the AAL type 5 protocol. Next, the data unit 4 is divided into fixed-length segments 5-1 to 5-k (k is an integer equal to or more than 2). Successive information fields 6-1 to 6-k are then attached to the segments 5-1 to 5-k, whereby data blocks 7-1 to 7-k are prepared. Each of the successive code fields 6-1 to 6-k denotes that the corresponding segment is the last one or a successive segment is following. The length of the dummy code field 3 is selected from a range between 0 and 44 octets so that the data length before dividing becomes integral multiples of the fixed length, 45 octets.

The data blocks 7-1 to 7-k are transferred to the CPS of the AAL type 2 protocol. In response, the data blocks 7-1 to 7-k are transformed into CPS packets 8-1 to 8-k by a process according to the AAL type 2 protocol. Next, the CPS packets 8-1 to 8-k are multiplexed and then transferred to the ATM layer. The multiplexed CPS packets are contained ATM cells 9 in the ATM layer, and then the ATM cells 9 are transferred to a physical layer.

By the above-described method, a high-rate data unit is first divided, and then multiplexed in the CPS. Therefore, it is expected that a statistical multiple effect can be also benefited at the CPS that is higher than the ATM layer.

However, by the function equivalent to AAL type 5 protocol in the SSCS, unnecessary data elements, which are not used in the CPS, are included in the data blocks 7-1 to 7-k transferred to the CPS from the SSCS. As shown in FIG. 9B, the restorative code field 2 includes an SSCS-UU (user-to-user) indication field of one octet, a CPI (common part indicator) field of one octet, a length indicator field of two octets, and an error correcting code field or cyclic redundancy check(CRC) field of four octets. However, the AAL type 2 protocol does not necessarily utilize some of them. Consequently, the redundancy of transmitted data is high in comparison with the communications simply using the AAL type 5 protocol and the AAL type 2 protocol in parallel, and transmission efficiency may be decreased.

On the other hand, the layer higher than the AAL is utilized typically for managing voice communication and data communication. In voice communication, it is not always necessary that all of data elements be transmitted as long as a certain quality is secured, but the information should be sent in real time. On the other hand, in data communication, all of the data elements must be transmitted accurately although quickness is not needed very much. Therefore, if a data error is found, it is necessary to retransmit in data communication.

Thus, it is the function of the higher layer to decide the necessity of retransmission whether or not the lower layer is the AAL type 2 protocol. When the retransmission is necessary, one or more data units (e.g., user frames) adapted to the higher layer are retransmitted from the higher layer. The user frame length adapted to the higher layer usually ranges between 256 octets and 64 kilo-octets.

On the other hand, the frame length should be small for transmission at the lower layers. For example, the frame length is 45 octets or less in accordance with the AAL type 2 protocol. Therefore, it is necessary to divide a user data frame from the higher layer into a plurality of segments before transferring them to the lower layers. However, since one or more user frames, which are longer, are retransmitted from the higher layer if a data error occurs, transmission efficiency may be decreased.

DISCLOSURE OF INVENTION

Accordingly, it is an object of the present invention to provide a data communication method for enhancing transmission efficiency, and to provide a data transmission processor and a data reception processor for realizing the method.

To solve the above problems, in one aspect of the present invention, the method comprises the steps of: dividing a data unit into a plurality of packets; attaching identifiers to the packets; transmitting the packets; receiving the packets; deciding whether all of the packets for reassembling the data unit are received in accordance with the identifiers; and reassembling the user data unit when the decision is affirmative.

BRIEF DESCRIPTION OF DRAWINGS

FIG. 3 is a block diagram showing the structure of a high-rate data transmission processor 23 in the transmission node 26 in FIG. 2 and the structure of a high-rate data reception processor 29 in the reception node 32 in FIG. 2;

FIG. 6 is a block diagram showing the structure of a high-rate data transmission processor 52 in the transmission node 51 in FIG. 5 and the structure of a high-rate data reception processor 54 in the reception node 53 in FIG. 5;

DETAILED DESCRIPTION

Embodiments of the present invention will be described below with reference to the accompanying drawings. Although it has been determined that the SSCS (service specific convergence sublayer) be served for high-rate data transmission in the recommendation with respect to the AAL type 2 by ITU-T, functions of the SSCS have not been determined specifically. Therefore, in the first and second embodiments of the present invention, the SSCS is responsible for new functions, so that low-rate data such as voice data and high-rate data can be transmitted with high quality.

1. FIRST EMBODIMENT

A first embodiment of the present invention will be described with reference to FIGS. 1A to 3.

Figure 1A:
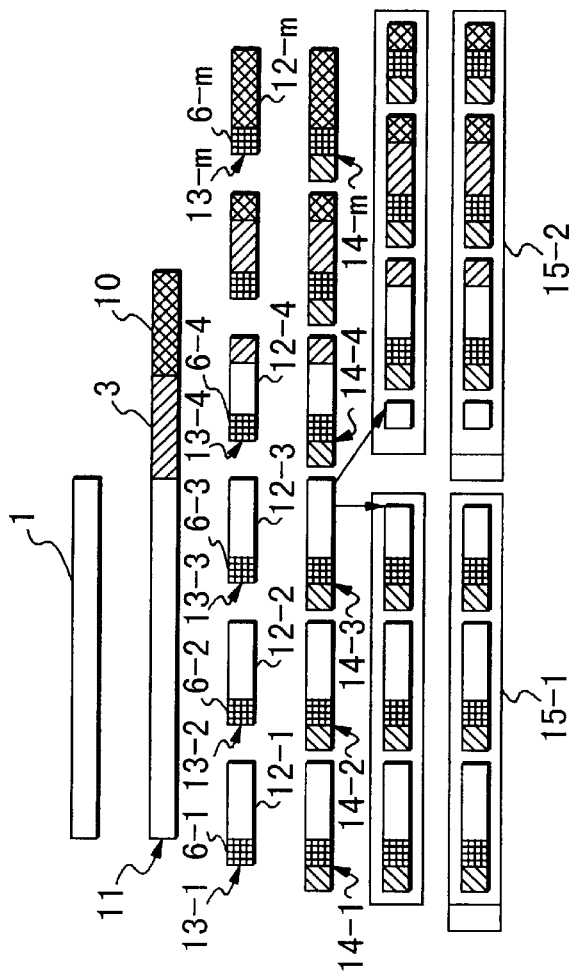
FIG. 1A is a conceptual diagram showing the hierarchical structure of the high-rate data side including the AAL type 2 protocol according to B-ISDN and showing data formats respectively corresponding to the layers used for a data communication method according to a first embodiment of the present invention.

FIG. 1A is a conceptual diagram showing the hierarchical structure of the high-rate data side including the AAL type 2 protocol according to B-ISDN and showing data formats respectively corresponding to the layers used for a data communication method according to a first embodiment of the present invention. In FIG. 1A, the same reference symbols are attached to elements that are common to FIG. 9A. However, the functions in the SSCS in FIG. 1A are limited to addition and elimination of dummy code fields, error correction, and segmentation and reassembly of data.

Figure 1B:
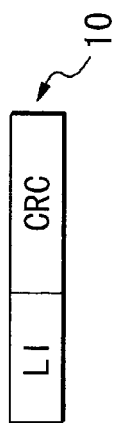
FIG. 1B is an illustration showing the data structure of a restorative code field 10 in FIG. 1A.
Figure 9A:
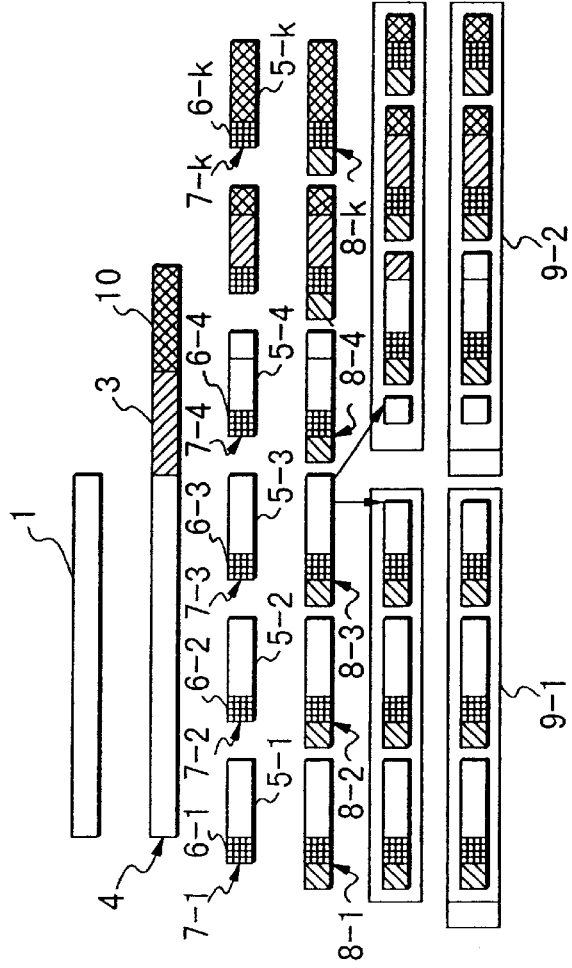
FIG. 9A is a conceptual diagram showing the hierarchical structure of the high-rate data side including the AAL type 2 protocol according to B-ISDN and showing data formats respectively corresponding to the layers used for a communication system in which the higher and extended sublayer of the AAL type 2 protocol has a function equivalent to the AAL type 5 protocol.

Moreover, the data format in FIG. 1A is different from that in FIG. 9A in that the restorative code field 10 is substituted for the restorative code field 2. FIG. 1B is an illustration showing the data structure of the restorative code field 10. As shown in FIG. 1B, the restorative code field 10 includes a length indicator field indicating the length of the user data unit 1, the length being possibly longer than 45 octets; and an error correcting code field for detecting deficiency and bit errors of the user data when restoring. Unlike the information field 2 of FIG. 9B, the information field 10 does not include the SSCS-UU field and CPI field.

Since the restorative code field 2 is replaced by the restorative code field 10, new symbols are attached to some elements in FIG. 1A: i.e., 11 to the data unit, 12-1 to 12-m to the segments, 13-1 to 13-m to the data blocks, 14-1 to 14-m to the CPS packets, 15 to the ATM cells, wherein m is an integer equal to or greater than 2, and equal to or less than k (see FIG. 9A). Similar to FIG. 9A, the hierarchical structure in FIG. 1A is a part of the entire hierarchical structure.

Figure 2:
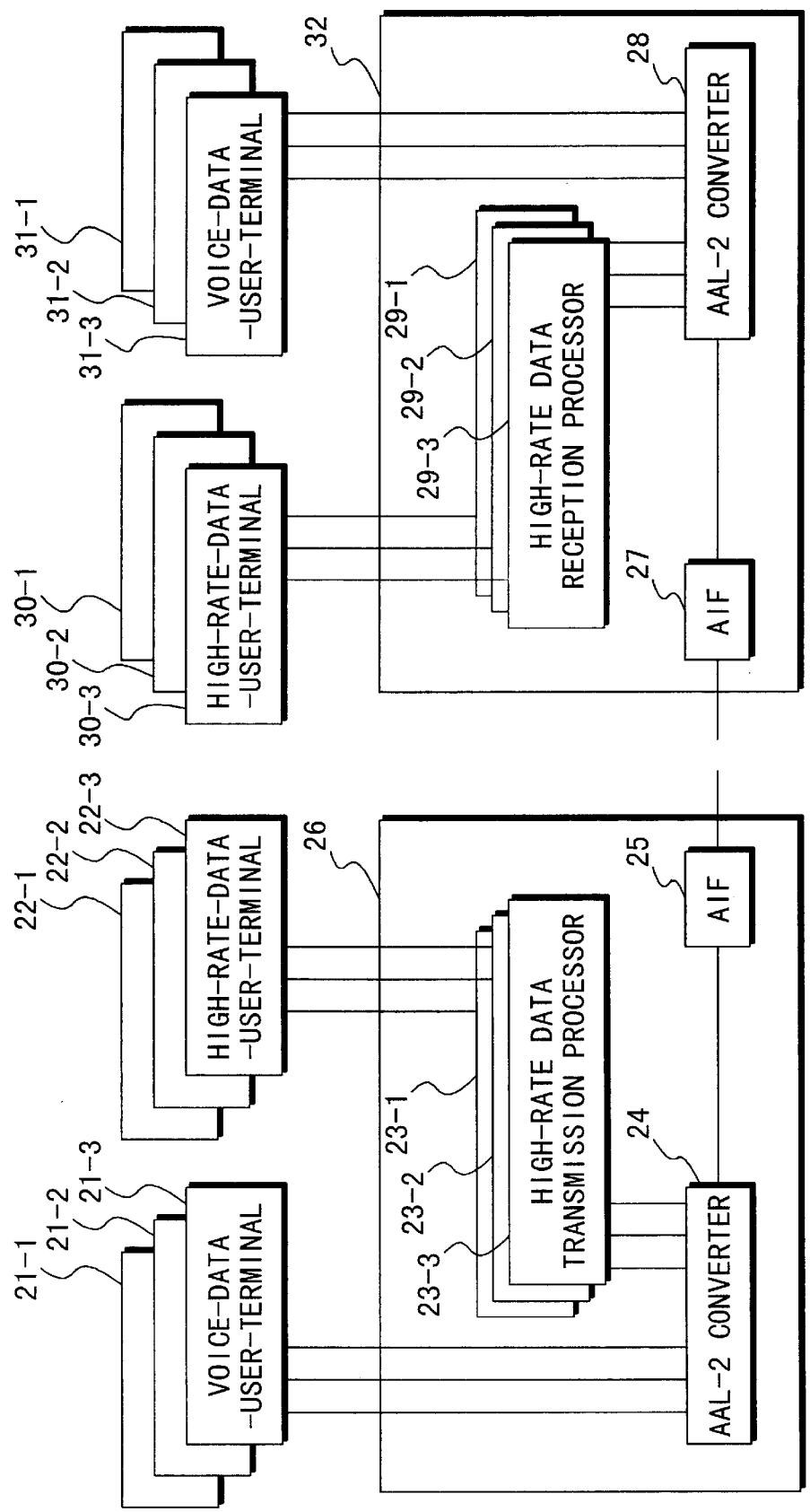
FIG. 2 is an schematic illustration showing the structures of a transmission node 26 and a reception node 32 for realizing the data communication method with the hierarchical structure in FIG. 1A.

FIG. 2 schematically shows the structures of a transmission node 26 and a reception node 32 for realizing data communication using the above hierarchical structure. In FIG. 2, symbols 21-1 to 21-3 and 13-1 to 13-3 designate voice-data-user-terminals for realizing the higher layer of the voice data side according to B-ISDN. Each of the voice-data-user-terminals 21-1 to 21-3 and 13-1 to 13-3 comprises device drivers and stores applications or software in relation to voice data communication for preparing and relaying voice user data.

Symbols 22-1 to 22-3 and 30-1 to 30-3 denote high-rate-data-user-terminals for realizing the higher layer of the high-rate data side of the hierarchical structure according to B-ISDN. Each of the high-rate-data-user-terminal 22-1 to 22-3 and 30-1 to 30-3 comprises device drivers and stores applications or software in relation to high-rate communication for preparing and relaying user data. The number of each user-terminal may be optionally selected although FIG. 2 shows three voice-data-user-terminals and three high-rate-data-user-terminals.

In the transmission node 26, each of high-rate data transmission processors 23-1 to 23-3 for realizing the SSCS, executes a process to user data units transferred from the corresponding high-rate-data-user-terminal 22-1, 22-2, or 22-3 as will be described later, and then transfers data blocks produced from the data units to a device for the layer than the SSCS. An AAL-2 converter 24 for realizing the CPS, attaches headers respectively to segments from any of the voice-data-user-terminals 21-1 to 21-3 and the high-rate data transmission processors 23, the header indicating data type, i.e., voice data or high-rate data. Then, the AAL-2 converter 24 converts the data blocks with the headers into CPS packets, multiplexes the CPS packets, and transfers them to a device for the lower layer. An AIF (ATM Interface) 25 for realizing the layer lower than the CPS, loads the CPS packets from the AAL-2 converter 24 in ATM cells, and then transmits the ATM cells through the ATM network.

In the reception node 32, an AIF 27 extracts the multiplexed CPS packets from the ATM cells transferred through the ATM network, and then conveys the CPS packets to the device for the higher layer. An AAL-2 converter 28 for realizing the CPS, divides the multiplexed CPS packets from the AIF 27 and transfers the data on the payloads of the CPS packets to a device for the higher layer (e.g., any of the voice-data-user-terminals 31-1 to 31-3) according to the type indicated by the header. Each of high-rate data reception processors 29-1 to 29-3 for realizing the SSCS, extracts data units from the received data blocks from the AAL-2 converter 28, and then transfers the user data units to the corresponding high-rate-data-user-terminal 30-1, 30-2, or 30-3 for the higher layer.

Next, structures of the high-rate data transmission processor 23 (any of 23-1 to 23-3) and the high-rate data reception processor 29 (any of 29-1 to 29-3) will be described below with reference to FIG. 3.

In the high-rate data transmission processor 23, a dummy-information-field-attaching module 23-$a$ prepares a dummy code field of a variable length (0 to 44 octets) and attaches it to the user data unit from the corresponding high-rate-data-user-terminal 22-1, 22-2, or 22-3 for the higher layer. The length of the dummy code field is adjusted so that the entire length of the data unit before dividing by a decomposing module 23-$c$ is integral multiples the 45 octets.

An error-control-calculating module 23-$b$ calculates an error correcting code (CRC) in accordance with a predetermined polynomial expression, referring to the user data unit with the dummy code field, and measures the length of the user data unit with the dummy code field. Then, the error control-calculating module 23-$b$ attaches the error correcting code field and the length indicator field to the data unit. Consequently, the assembled data unit is constituted of the user data unit, dummy code field, length indicator field, and error correcting code field, so that the error correcting code is served for only the user data unit, dummy code field, and length indicator field.

A decomposing module 23-$c$ divides the data unit, constituted of the user data unit, dummy code field, length indicator field, and error correction code field, into fixed-length segments. Also, the decomposing module 23-$c$ attaches successive code fields to the segments, respectively, and then transfers the segments to the AAL-2 converter 24 for the lower layer. The segments with the successive code fields are contained in payloads of the CPS packet. Each of the successive code fields denotes that the corresponding segment is the last one or successive segment is following as similar to the aforementioned successive code fields.

On the other hand, in the high-rate data reception processor 29, an assembling module 29-$a$ temporarily stores the segments received from the AAL-2 converter 28, referring to the successive code fields of the segments, and reassembles a data unit from the segments.

An error-control-calculating module 29-$b$ receives the data unit assembled by the assembling module 29-$a$ and detects the error correcting code of the data unit. In addition, the error-control-calculating module 29-$b$ calculates an error correcting code in accordance with the above-mentioned polynomial expression again. The existing error correcting code field is ignored in this calculation. Then, the error-control-calculating module 29-$b$ compares the newly calculated code with the former code in the CRC field. When the comparison determination (error detection) is affirmative (the calculation code is equal to the former code), the error-control-calculating module 29-$b$ transfers the data unit to a dummy-information-field-eliminating module 29-*c*. When the comparison determination is negative (the calculation result is not equal to the former CRC code), the error-control-calculating module 29-*b* deletes the data unit, and provides a notice to the dummy-information-field-eliminating module 29-*c*.

In response to reception of the data unit from the error-control-calculating module 29-*b*, the dummy-information-field-eliminating module 29-*c* extracts a user data unit from the data unit in accordance with the length indicator of the data unit, and transfers the user data unit to the corresponding high-rate-data-user-terminal 30-1, 30-2, or 30-3 for the higher layer. If the notice of the negative comparison determination is received, the dummy-information-field-eliminating module 29-*c* carries out another operation that is predetermined for the higher layer.

Next, data transmission from the transmission node 26 to the reception node 32 will be described with reference to FIGS. 1A and 2. However, since voice data transmission from the voice-data-user-terminals 21-1 to 21-3 to the voice-data-user-terminals 31-1 to 31-3 is nothing more than the usual process for the AAL type 2 protocol, only high-rate data transmission process from the high-rate-data-user-terminals 22-1 to 22-3 to the high-rate-data-user-terminals 30-1 to 30-3 will be described below.

First, when the user data unit 1 having a length exceeding a fixed length is transferred from any of the high-rate-data-user-terminals 22-1 to 22-3 to the high-rate data transmission processor 23 in the transmission node 26, the dummy code field 3 is attached to the user data unit 1 in the high-rate data transmission processor 23 corresponding to the high-rate-data-user-terminal. Then, the restorative code field 10 is further attached to the user data unit 1, whereby the data unit 11 is constructed.

The data unit 11 is next divided into segments 12-1 to 12-m of a fixed-length (45 octets), and then, the successive code fields 6-1 to 6-m are attached to the segments, respectively, so that the data blocks 13-1 to 13-m are constructed. The data blocks 13-1 to 13-m are successively transferred to the AAL-2 converter 24, and are converted into CPS packets 14-1 to 14-m, and then multiplexed in the AAL-2 converter 24. The ATM cells 15 are then transmitted through the ATM network.

In the AIF 27 of the reception node 32, the ATM cells 15 supplied through the ATM network are received, and then the multiplexed CPS packets are extracted from the ATM cells 15. The multiplexed CPS packets are divided into the individual CPS packets 14-1 to 14-m in the AAL-2 converter 28. Moreover, in the AAL-2 converter 28, the data blocks 13-1 to 13-m are restored from the divided CPS packets 14-1 to 14-m, and successively transferred to the corresponding high-rate data reception processor 29. In the high-rate data reception processor 29, the data unit 11 is reassembled in accordance with the successive code fields 6-1 to 6-m in the data blocks 13-1 to 13-m.

In addition, the error detection of the combination of the user data unit 1, the dummy code field 3, and the length field is executed. That is, the recalculated error correction code is compared with the former code in the data unit 11. When the comparison determination is affirmative, the user data unit 1 is extracted from the data unit 11 in accordance with the length indicator of the restorative code field 10, and then the user data unit 1 is transferred to the corresponding high-rate-data-user-terminal. If the comparison determination is negative, the notice of the negative comparison determination is provided to the corresponding high-rate-data-user-terminal, and the data unit 11 is deleted.

Figure 9B:
FIG. 9B is an illustration showing the data structure of restorative code field 10 in FIG. 9A.

As clearly understood from the above description, since the data unit 11 does not include the SSCS-UU field and CPI field, the data length of the unit 11 is two octets shorter than that of the data unit 4 (see FIGS. 9A and 9B). Therefore, this embodiment enables to efficiently transmit high-volumes of data while minimizing the transmission delay of voice data.

That is, by virtue of this embodiment, it is possible to transmit, using with the AAL type 2 protocol, not only low-rate data units, such as voice data, of which the length is short, but also high-rate data units, of which the length is greater than the payload length (45 octets) determined by the AAL type 2 protocol. Moreover, since the high-rate user data unit is divided into a plurality of segments and then the segments are transferred to the AAL type 2 converter, it is possible to obtain the statistical multiple effect at the AAL type 2 converter and the lower layers. Therefore, it is possible to minimize transmission delay of low-rate data such as voice data. Moreover, because the length of the additional fields (restorative code field) for the user data unit 1 can be decreased, it is possible to prevent the transmission efficiency from being lowered.

2. SECOND EMBODIMENT

Next, a second embodiment of the present invention will be described below with reference to FIGS. 4A to 6.

Figure 4A:
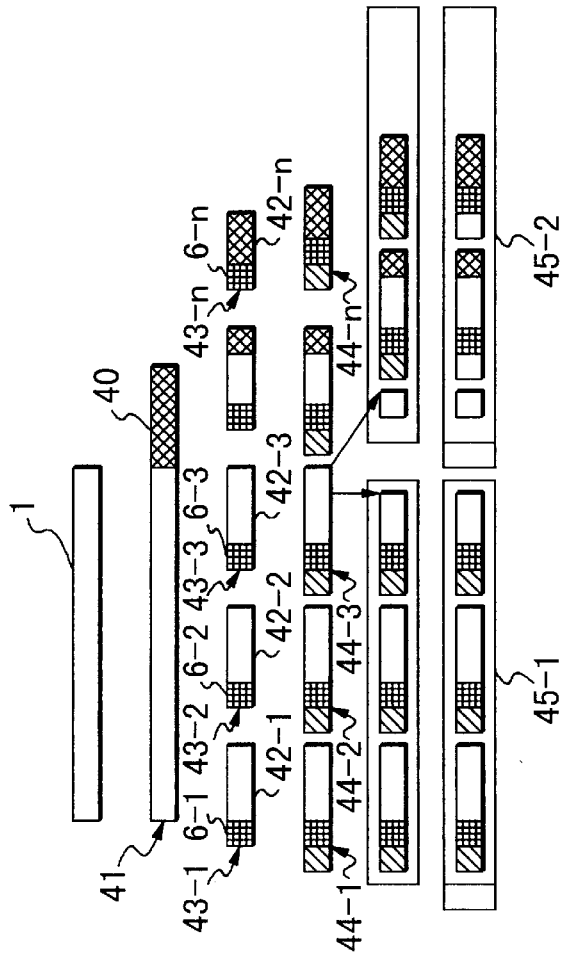
FIG. 4A is a conceptual diagram showing the hierarchical structure of the high-rate data side including the AAL type 2 protocol according to B-ISDN and showing data formats respectively corresponding to the layers used for a data communication method according to a second embodiment of the present invention.

FIG. 4A is a conceptual diagram showing the hierarchical structure of the high-rate data side including the AAL type 2 protocol according to B-ISDN and showing data formats respectively corresponding to the layers used for a data communication method according to a second embodiment of the present invention. In FIG. 4A, the same reference symbols are attached to elements that are common to FIG. 1A. The hierarchical structure shown in FIG. 4A is different from that in FIG. 1A in that the SSCS in FIG. 4A is not responsible for the addition and elimination of the dummy code field.

Figure 4B:
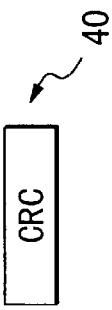
FIG. 4B is an illustration showing the data structure of restorative code field 40 in FIG. 4B.

Moreover, unlike the data format in FIG. 1A, the dummy code field 3 is not attached and a restorative code field 40 is substituted for the restorative code field 10 in FIG. 4A. FIG. 4B is an illustration showing the data structure of the restorative code field 40. As shown in FIG. 4B, the restorative code field 40 is constituted of only the error correcting code field for detecting deficiency and bit errors of the user data unit 1 when restoring and does not include the length indicator field indicating the length of the user data unit 1.

Figure 8:
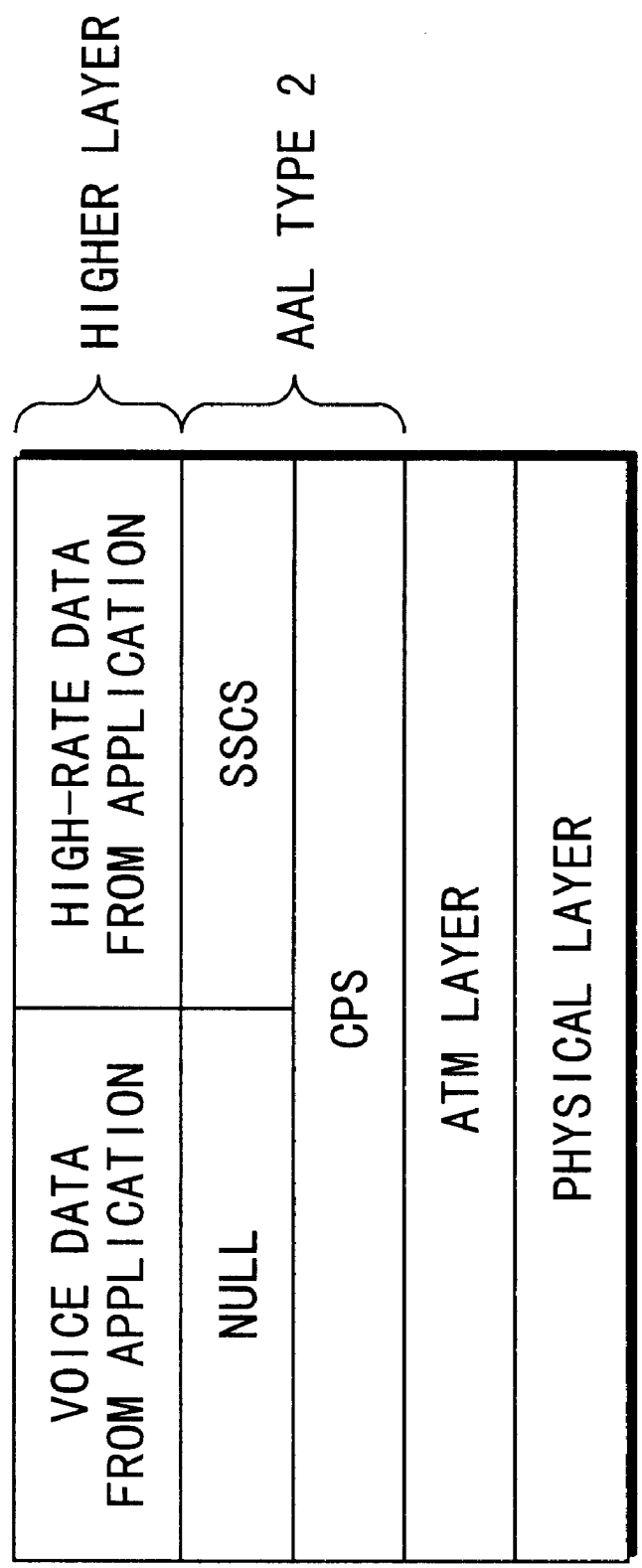
FIG. 8 is a diagram showing the hierarchical structure including the AAL type 2 protocol according to B-ISDN.

Since the restorative code field 40 is substituted for the restorative code field 10 and the dummy code field 3 is excluded, new symbols are attached to some elements in FIG. 4A: i.e., 41 to the data unit, 42-1 to 42-n to the segments, 43-1 to 43-n to the data blocks, 44-1 to 44-n to the CPS packets, 45 to the ATM cells, wherein n is an integer equal to or greater than 2, and equal to or less than m (see FIG. 1A). As similar to FIG. 9A, the hierarchical structure in FIG. 4A is a part of the entire hierarchical structure shown in FIG. 8.

Figure 5:
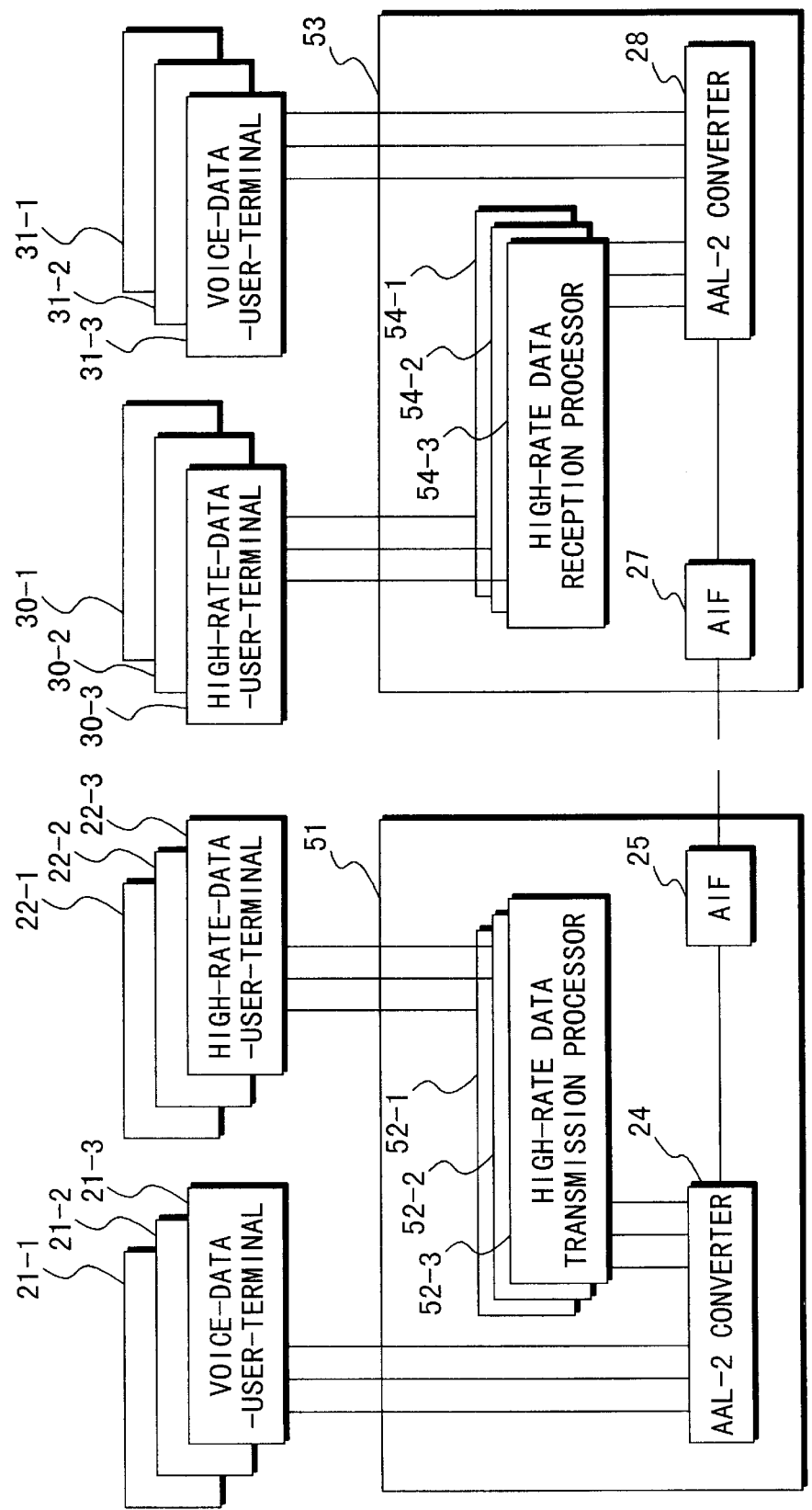
FIG. 5 is schematic illustration showing the structures of a transmission node 51 and a reception node 53 for realizing the data communication method with the hierarchical structure in FIG. 4A.

FIG. 5 is a schematic illustration showing the structures of a transmission node 51 and a reception node 53 for realizing the data communication method using the hierarchical structure in FIG. 4A. In FIG. 5, the same reference symbols are attached to elements that are common to FIG. 2.

In the transmission node 51 in FIG. 5, each of high-rate data transmission processors 52-1 to 52-3 for realizing the SSCS, executes a process to user data units transferred from the corresponding high-rate-data-user-terminals 22-1, 22-2, or 22-3 as will be described later, and then transfers data blocks produced from the data units to a device for the layer below than the SSCS. In the reception node 53, each of high-rate data reception processors 54-1 to 54-3 for realizing the SSCS, reassembles the user data unit from data blocks received from the AAL-2 converter 28, and then transfers the user data unit to one of the high-rate-data-user-terminals 30-1 to 30-3 for the higher layer.

Next, structures of the high-rate data transmission processor 52 (any of 52-1 to 52-3) and high-rate data reception processor 54 (any of 54-1 to 54-3) will be described below with reference to FIG. 6.

In the high-rate data transmission processor 52, an error-control-calculating module 52-a receives the user data unit from the corresponding high-rate-data-user-terminals 22-1, 22-2, or 22-3. Then, the error-control-calculating module 52-a calculates an error correcting code (CRC) of four octets in accordance with a predetermined polynomial expression, referring to the user data unit, and then, attaches the error correcting code field to the user data unit. Consequently, the assembled data unit is constituted of the user data unit and error correcting code field, so that the error correcting code is provided for only the user data unit.

A decomposing module 52-b divides the data unit, constituted of the user data unit and CRC field, into segments of a fixed length of 45 octets. However, it is possible that the last segment has a length less than the fixed length. Also, the decomposing module 52-b attaches successive code fields to the segments, respectively, and then transfers the segments to the AAL-2 converter 24 for the lower layer.

In the high-rate data reception processor 54, an assembling module 54-a temporarily stores the segments received from the AAL-2 converter 28, and reassembles a data unit from the segments.

An error-control-calculating module 54-b receives the data unit assembled by the assembling module 54-a and detects the error correcting code of the data unit. In addition, the error-control-calculating module 54-b calculates an error correcting code in accordance with the abovementioned polynomial expression again. The existing CRC field attached to the data unit is ignored in this calculation, and therefore, the user data unit is only referenced. Then, the error-control-calculating module 54-b compares the newly calculated code with the former code in the CRC field. When the comparison determination (error detection) is affirmative (the calculation code is equal to the former code), the error-control-calculating module 54-b transfers the data unit to the corresponding high-rate-data-user-terminal 30-1, 30-2, or 30-3. When the comparison determination is negative (the calculation result is not equal to the former CRC code), the error-control-calculating module 54-b deletes the data unit, and provides a notice to the high-rate-data-user-terminal 30.

The data communication process from the transmission node to the reception node will be described below with reference to FIGS. 4A, 4B and 5.

First, when the user data unit 1 having a length exceeding the fixed length is transferred to the high-rate data transmission processor 52 from any of the high-rate-data-user-terminals 22-1 to 22-3 in the transmission node 51, the restorative code field 40 is attached to the user data unit 1, whereby the data unit 41 is constructed in the high-rate data transmission processor 52 corresponding to the high-rate-data-user-terminal. The data unit 41 is then divided into the segments 42-1 to 42-p (wherein p=n−1) of the fixed length and segments 42-n of a length less than the fixed length. Next, the successive code fields 6-1 to 6-n are attached to the segments 42-1 to 42-n, respectively, whereby the data blocks 43-1 to 43-n are constructed. The data blocks 43-1 to 43-n are then transferred to the AAL-2 converter 24. Subsequent procedures in the transmission node 51 are the same as those of the first embodiment.

When the reception node 53 receives the ATM cells, the data blocks 43-1 to 43-n are restored by the AAL-2 converter 28 and are successively transferred to the corresponding high-rate data reception processor 54. Then, in the high-rate data reception processor 54, the data unit 41 is reassembled in accordance with the successive code fields 6-1 to 6-n in the data blocks 43-1 to 43-n. Next, the comparison determination (error detection) is carried out for the user data unit 1 in accordance with the error correcting code contained in the restorative code field 40 in the data unit 41. When the comparison determination is affirmative, the user data unit 1 is obtained by excluding the CRC field of four octets, and is transferred to the corresponding high-rate-data-user-terminal. However, if the comparison determination is negative, a notice of the negative comparison determination is provided to the corresponding high-rate-data-user-terminal and the data unit 41 is deleted.

As described above, since the data unit 41 does not include the SSCS-UU field, CPI field, dummy code field, and length indicator field, the data length of the unit 41 is two through 46 octets shorter than that of the data unit 11. Therefore, this embodiment enables to further improve the advantages obtained by the first embodiment.

As n variation of the second embodiment, even if the restorative code field 40 includes the length indicator field, it is also possible to improve the advantages obtained by the first embodiment since the data unit 41 does not include the SSCS-UU field, CPI field, and dummy code field.

3. THIRD EMBODIMENT

3.1. Data Formats of CPS Packets Used in Third Emodiment

A third embodiment will be described next. This embodiment is a modification of the first and second embodiments in order to conduct retransmission if a data error occurs.

First, data formats of CPS packets transmitted in the third embodiment will be described below. FIGS. 10 to 13 are conceptual diagrams showing data formats of CPS packets to which retransmission control parameters are attached.

3.1.1. CPS Packed for Sending Usual User Data

Figure 10:
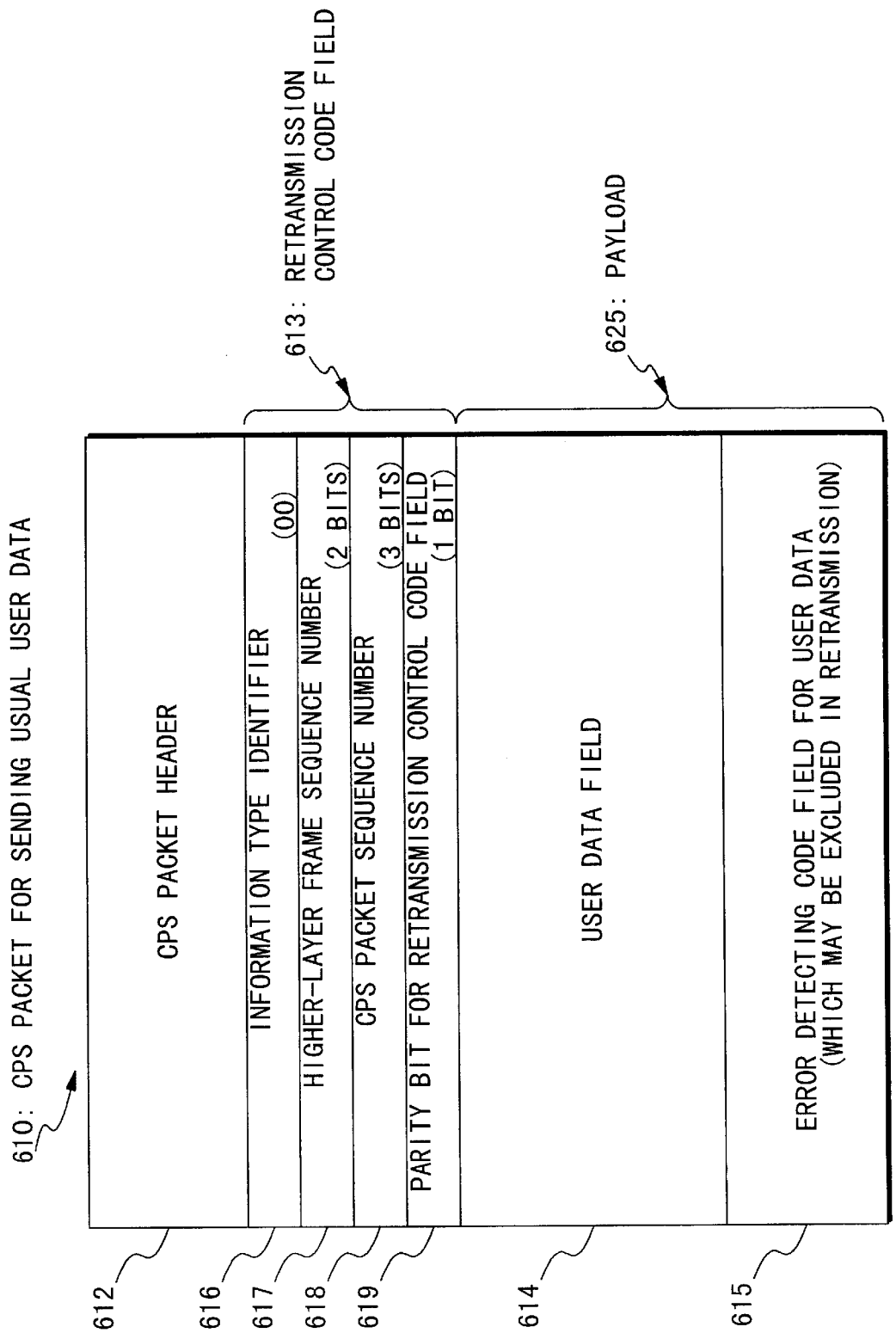
FIG. 10 shows a CPS packet 610 for sending usual user data, which is sent by the source device to the destination device.

FIG. 10 shows a CPS packet 610 for sending usual user data. The CPS packet 610 is constituted of a CPS packet header 612, a retransmission control code field 613, and a payload 625. Contained in the retransmission control code field 613, are an information type identifier 616, a higher-layer frame sequence number 617, a CPS packet sequence number 618, and a parity bit 619 for the retransmission control code field 613.

The payload 625 includes a user data field 614 and an error detecting code field 615 for the user data. The user data in the field 614 are data of a short higher-layer frame or a segment obtained by dividing a long higher-layer frame. The error detecting code in the field 615 is an error correcting code (CRC) for detecting an error of the user data field 614. However, when retransmission the CPS packet 610, the error correcting code field 615 may be excluded from the retransmitted CPS packet 610.

The error detecting code attached by a source device is checked by a destination device, which receives the CPS packet 610. Accordingly, the destination device informs the source device of a request for retransmission when the check result is extraordinary.

Figure 11:
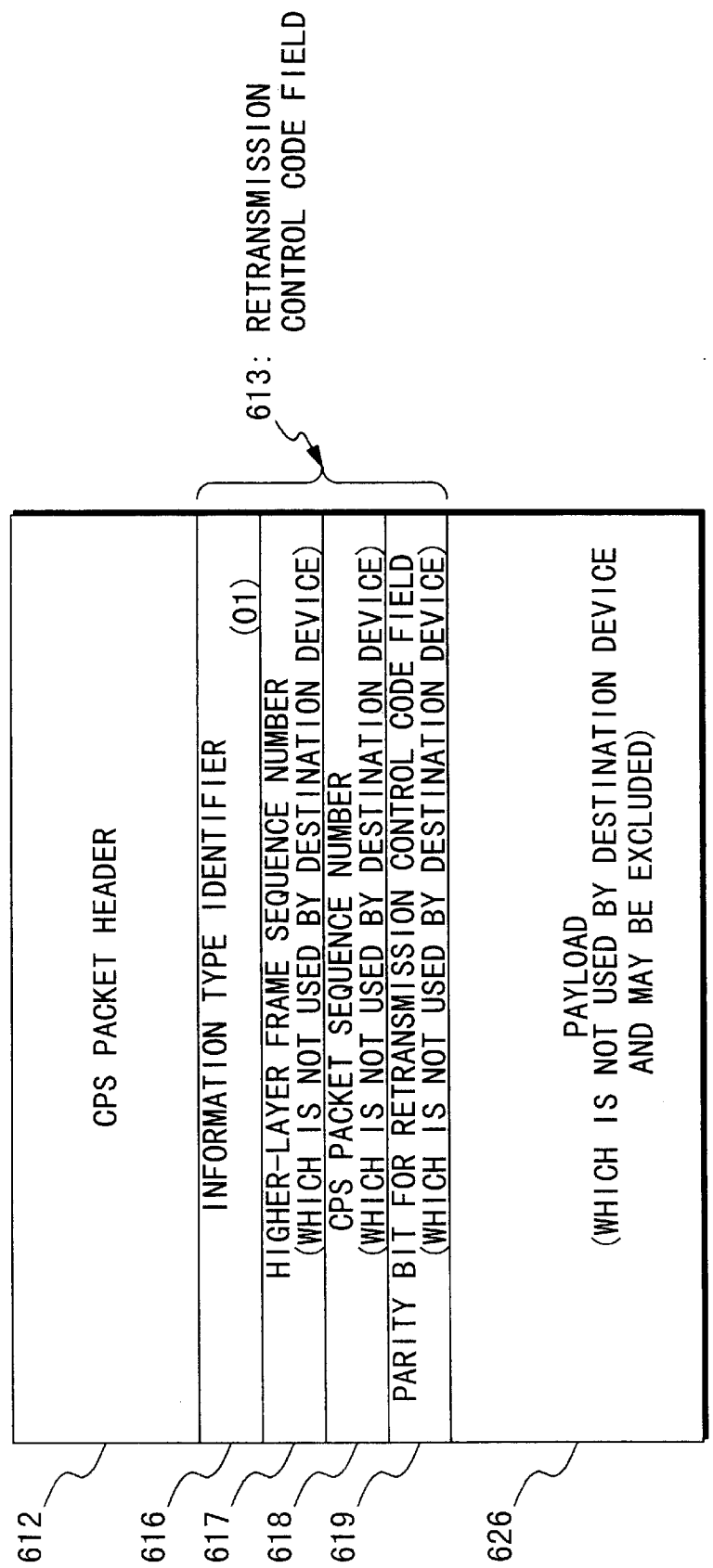
FIG. 11 shows a CPS packet 620 for requesting confirmation, which is sent by the source device to the destination device.
Figure 12:
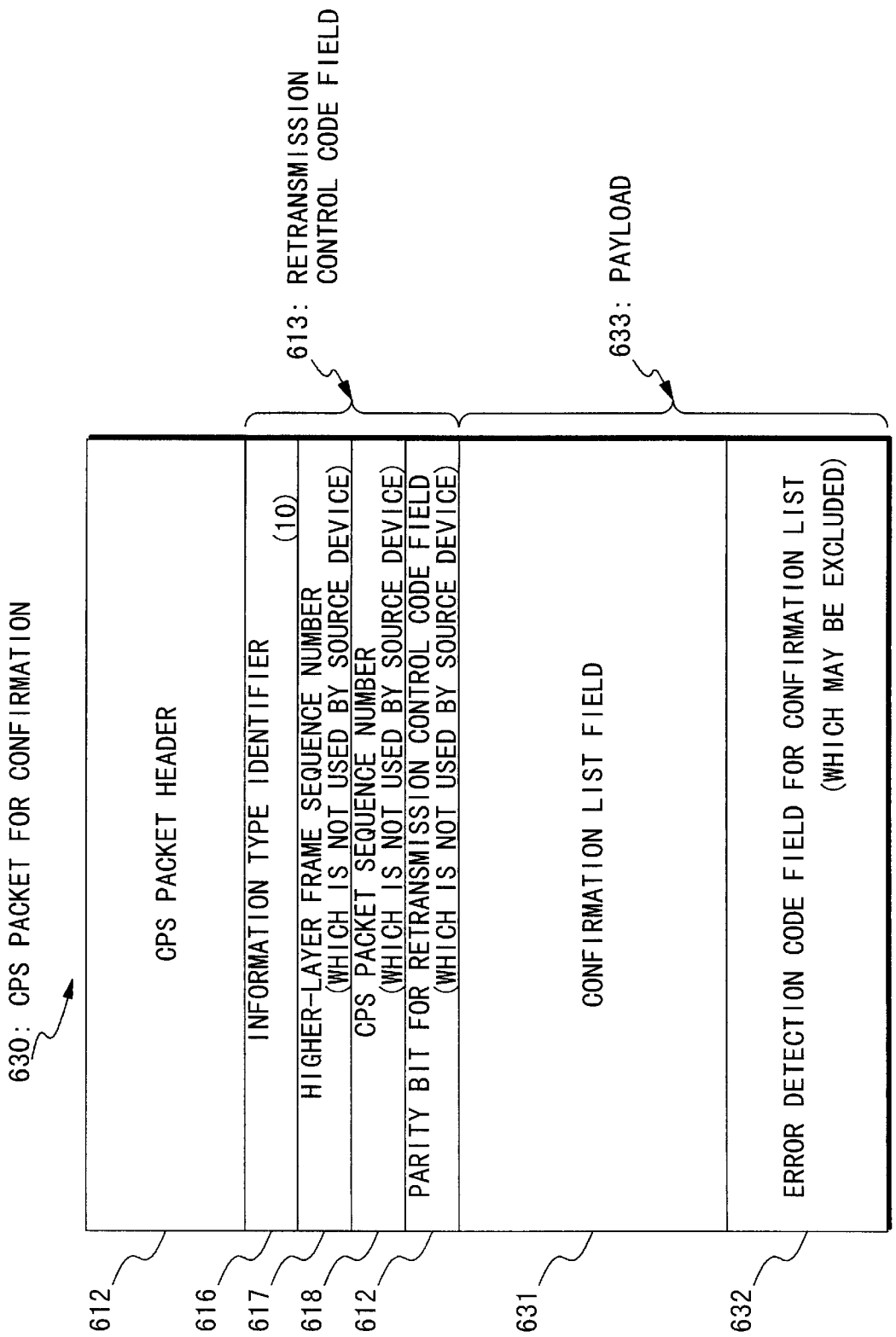
FIG. 12 shows a CPS packet 630 for requesting confirmation, which is sent by the destination device to the source device.
Figure 13:
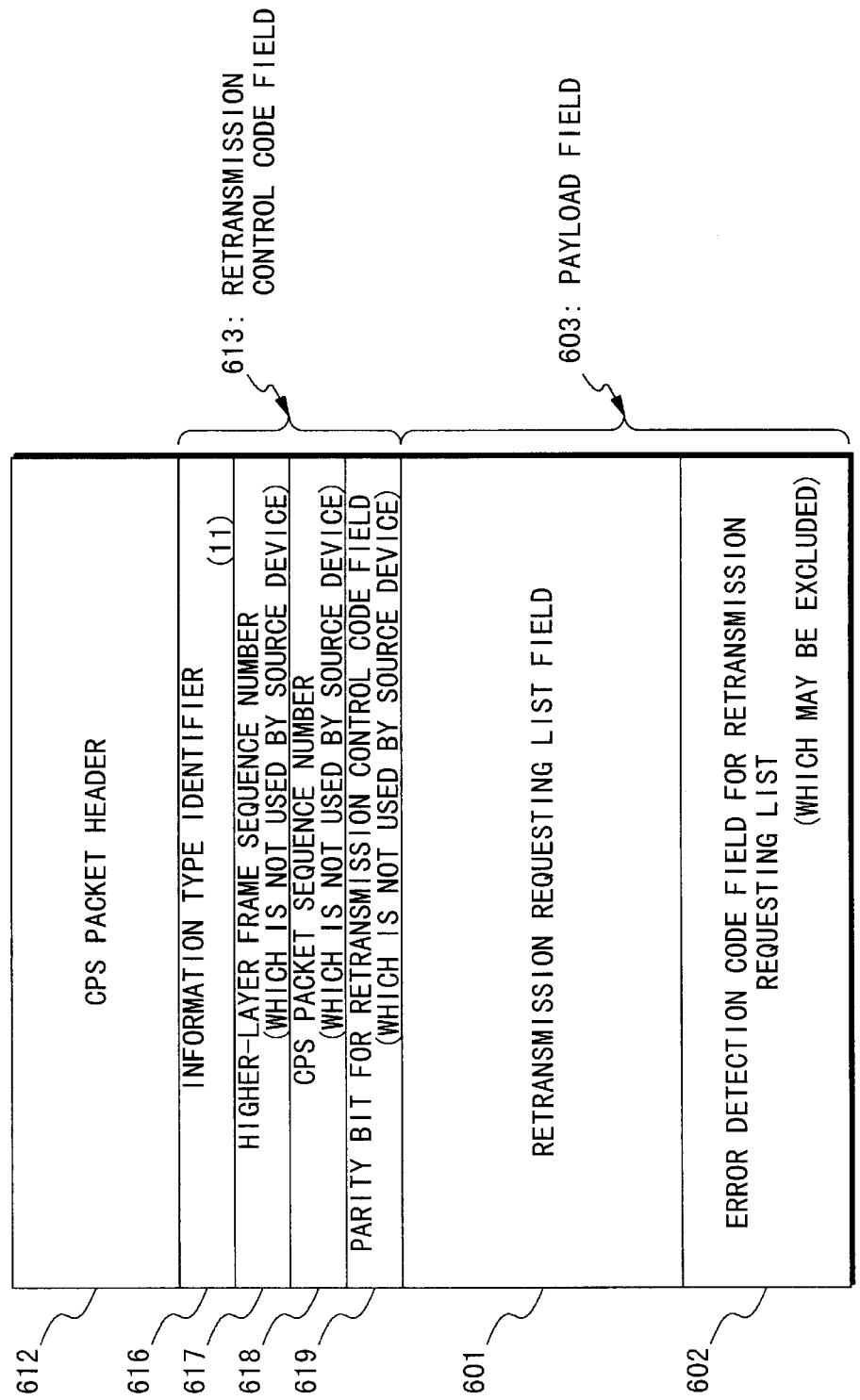
FIG. 13 shows a CPS packet 600 for requesting retransmission, which is sent by the destination device to the source device.

The information type identifier 616 of two bits identifies the type of the corresponding CPS packet:

- the identifier 616 is "00" if the CPS packet is the CPS packet 610, for sending usual user data, which is sent by the source device to the destination device;
- the identifier 616 is "01" if the CPS packet is a CPS packet 620 shown in FIG. 11, for requesting confirmation, which is sent by the source device to the destination device;
- the identifier 616 is "10" if the CPS packet is a CPS packet 630 shown in FIG. 12, for confirmation, which is sent by the destination device to the source device; and
- the identifier 616 is "11" if the CPS packet is a CPS packet 600 shown in FIG. 13, for requesting retransmission, which is sent by the destination device to the source device.

Since FIG. 10 shows the CPS packet 610, the identifier 616 is "00".

The higher-layer frame sequence number 617 indicates which higher-layer frame the user data in the payload 625 is originated from. More specifically, when transmitting every higher-layer frame, the sequence number 617 is changed, and then the changed number is attached to a CPS packet or all CPS packets originated from one higher-layer frame. Since the length of the number 617 is only two bits, the code is used in cyclic for the number 617. This number is given and managed by the source device.

The CPS packet sequence number 618 is used for supervising the order of succession of CPS packets in the destination device. When forming every CPS packet from the higher-layer frame, the sequence number 618 may be changed and then attached to the CPS packet. This is especially convenient if CPS packets are originated from segments obtained by dividing a higher-layer frame. This number is also given and managed by the source device. It is preferable that the code is used in cyclic for the number 618, too. It is also possible that, when transmitting a new higher-layer frame, the CPS packet sequence number 618 be reset.

3.1.2. CPS Packet for Requesting Confirmation

FIG. 11 shows a CPS packet 620, for requesting confirmation, which may be transmitted from the source device to the destination device. In response to the CPS packet 620, the destination device may reply with a confirmation to the source device. The CPS packet 620 includes the CPS packet header 612, which is the same as in the CPS packet 610. However, the information type identifier 616 is "01" in order to indicate that this packet 620 requests the confirmation. Although the CPS packet 620 contains the higher-layer frame sequence number 617, CPS packet sequence number 618, and parity bit 619, the destination device does not use them. In addition, although a payload 626 is contained in the CPS packet 620 in FIG. 11, it can be excluded from the CPS packet 620 since the destination device does not use it.

Further to the confirmation-requesting CPS packet 600, a timer may be equipped in the source device since it is possible that the destination device does not receive the confirmation-requesting CPS packet 620. In this case, the timer limit is set to a time period that is necessary for a confirmation CPS packet 630, which will be described later, to reach the source device. If the timer count is reached to the limit, the source device makes the retransmission.

3.1.3. Confirmation CPS Packet

When the CPS packet 620 for requesting confirmation is transmitted from the source device to the destination device after the usual user data CPS packet 610 is normally received by the destination device, a CPS packet 630 for confirmation shown in FIG. 12 is sent from the destination device to the source device. The CPS packet 630 includes the CPS packet header 612, which is the same as in the CPS packet 610. However, the information type identifier 616 is "10" in order to indicate that this packet 630 confirms the reception finish of sequential CPS packets 610 originated from a single higher-layer frame. Although the CPS packet 630 contains the higher-layer frame sequence number 617, CPS packet sequence number 618, and parity bit 619, the source device does not use them.

The CPS packet 630 contains a payload 633, wherein contained are a confirmation list field 631 and an error detection code field 632 for the confirmation list. The confirmation list in the field 631 enumerates CPS packets received by the destination device normally before sending the CPS packet 630 or in a certain time period before sending the CPS packet 630. The error detection code field 632 is a CRC for detecting an error of the list field 631, but is not necessarily contained in the CPS packet 630.

3.1.4. CPS Packet for Requesting Retransmission

When the CPS packet 620 for requesting confirmation is transmitted from the source device to the destination device after the usual user data CPS packet 610 is not appropriately received by the destination device, a CPS packet 600 for requesting retransmission shown in FIG. 13 is transmitted from the destination device to the source device.

The CPS packet 600 includes the CPS packet header 612, which is the same as in the CPS packet 610. However, the information type identifier 616 is "11" in order to indicate that this packet 600 requests the retransmission. Although the CPS packet 600 contains the higher-layer frame sequence number 617, CPS packet sequence number 618, and parity bit 619, the source device does not use them.

The CPS packet 600 contains a payload 603, wherein contained are a retransmission requesting list field 601 and error detection code field 602 for the retransmission requesting list. The retransmission requesting list in the field 631 enumerates CPS packets that are not received by the destination device normally before sending the CPS packet 600 or in a certain time period before sending the CPS packet 600. The error detection code field 602 is a CRC for detecting an error of the retransmission requesting list field 601, but is not necessarily contained in the CPS packet 600.

3.2. System Structure of Third Embodiment 3.2.1. Generic Structure

Figure 14:
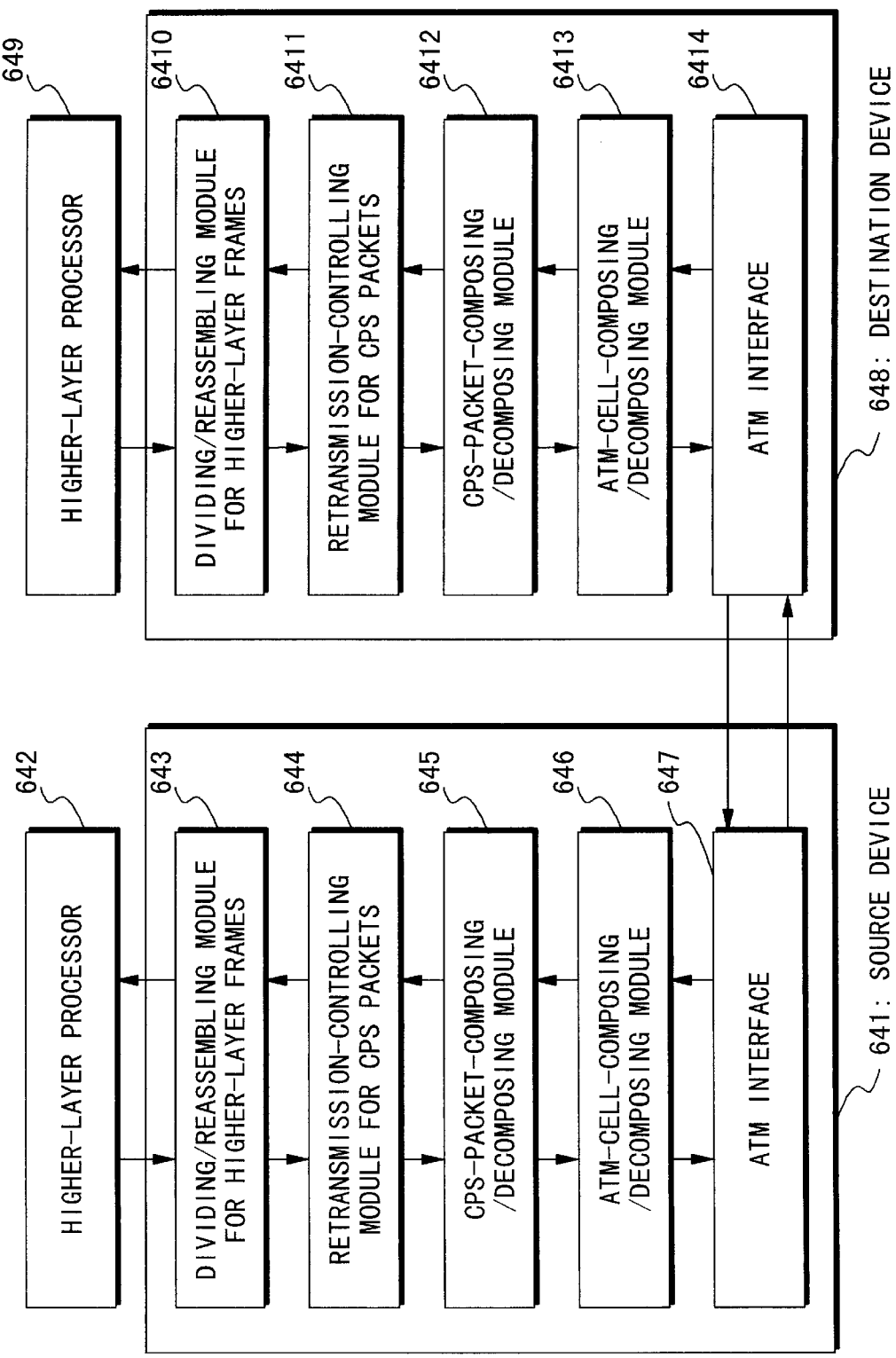
FIG. 14 shows a system structure according to a third embodiment.

FIG. 14 shows the system structure according to a third embodiment. The system in FIG. 14 comprises a source device 641 being equivalent to the transmission node 26 or 51 of the first or second embodiment; a higher-layer processor 642 being equivalent to one of the user-terminals 21-1 to 21-3 and 22-1 to 22-3 of the first or second embodiment; a destination device 648 being equivalent to the reception node 32 or 53 of the first or second embodiment; and a higher-layer processor 649 being equivalent to one of the user-terminals 30-1 to 30-3 and 31-1 to 31-3 of the first or second embodiment.

As shown in FIG. 14, the devices 641 and 648 are of the same structure as each other in fact: i.e., modules 643 to 647 in the device 641 are the same as modules 6410 to 6414 in the device 648. Therefore, the same operation can be carried out by any of the devices 641 and 648. However, in order to simplify the description, the devices 641 and 648 are called source device and destination device, respectively.

The source device 641 comprises a dividing/reassembling module 643 for higher-layer frames. The dividing/reassembling module 643 receives a higher-layer frame supplied from the higher-layer processor 642 or 649 and divides it into segments if necessary. The dividing/reassembling module 643 then transfers CPS packet or packets to a retransmission-controlling module 644. When CPS packets are supplied from the retransmission-controlling module 644, the dividing/reassembling module 643 reassembles a higher-layer frame from the CPS packets if necessary. The module 643 then transfers the higher-layer frame to the higher-layer processor 642.

The retransmission-controlling module 644 transfers data between the dividing/reassembling module 643 and a CPS-packet-composing/decomposing module 645. In addition, the module 644 is responsible for various functions for retransmission of CPS packets. The structure and functions of the retransmission-controlling module 644 will be described in detail later.

The CPS-packet-composing/decomposing module 645 attaches CPS packet header 612 to each of the non-divided higher-layer frame or divided segments, so as to compose CPS packets, and then transfers the CPS packets to an ATM-cell-composing/decomposing module 646. In reception mode, the CPS-packet-composing/decomposing module 645 eliminates the CPS packet header from each CPS packet received from the ATM-cell-composing/decomposing module 646, and then transfers the remaining data block to the retransmission-controlling module 644.

The ATM-cell-composing/decomposing module 646 attaches an ATM cell header to each of the CPS packets, so as to compose ATM cells, and then transfers the ATM cells to an ATM interface 647. In reception mode, the ATM-cell-composing/decomposing module 646 eliminates the ATM cell header from each ATM packet received from the ATM interface 647, and then transfers the remaining CPS packet to the CPS-packet-composing/decomposing module 645. The ATM interface 647 transmits and receives the ATM cells to and from the ATM interface 6414 of the destination device 648.

3.2.2. Dividing/Reassembling Module 643 for Higher-Layer

Figure 15:
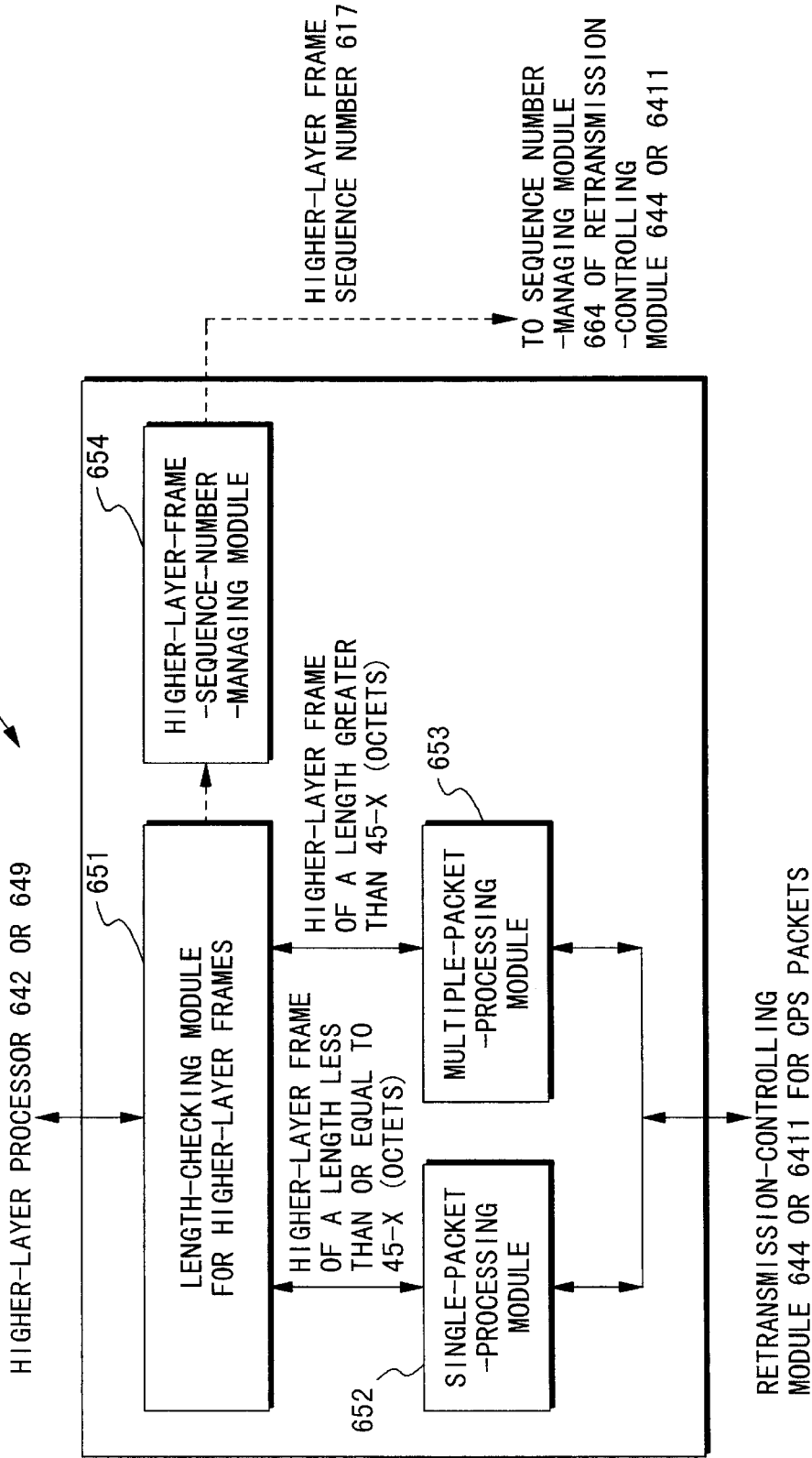
FIG. 15 shows a structure of a dividing/reassembling module 643 for higher-layer frames according to the third embodiment.

FIG. 15 shows in detail the structure of the dividing/reassembling module 643 for higher-layer frames. The dividing/reassembling module 643 comprises a length-checking module 651 for higher-layer frames. The length-checking module 651 determines if higher-layer frames, transferred from the higher-layer processor 642, are longer than 45-X (octets) or not, wherein X is the length of the retransmission control code field 613. Specifically, in the embodiment, X is one octet (eight bits) as shown in FIGS. 10 to 13.

However, X may vary due to contents of the retransmission control code field 613. For example, it is possible that a CPS packet contains a division information field indicating if the CPS packet is originated from a segment divided from a higher-layer frame or not in order to facilitates reassembling the higher-layer frame. In this case, X is one octet longer than the length of the division information field.

If the length-checking module 651 determines that a higher-layer frame is longer than 45-X (octets), the checking module 651 transfers it to a multiple-packet-processing module 653. In the processing module 653, the higher-layer frame is divided into CPS packets. The CPS packets are then transferred to the retransmission-controlling module 644.

However, if a higher-layer frame is not longer than 45-X (octets), the frame is transferred through a single-packet-processing module 652 to the retransmission-controlling module 644.

The dividing/reassembling module 643 also includes a higher-layer-frame-sequence-number-managing module 654. When a new higher-layer frame is supplied to the length-checking module 651, the managing module 654 renews a higher-layer-frame-sequence-number signal 655.

3.2.3. Transmitting Organization of Retransmission-Controlling Module 644

Figure 16:
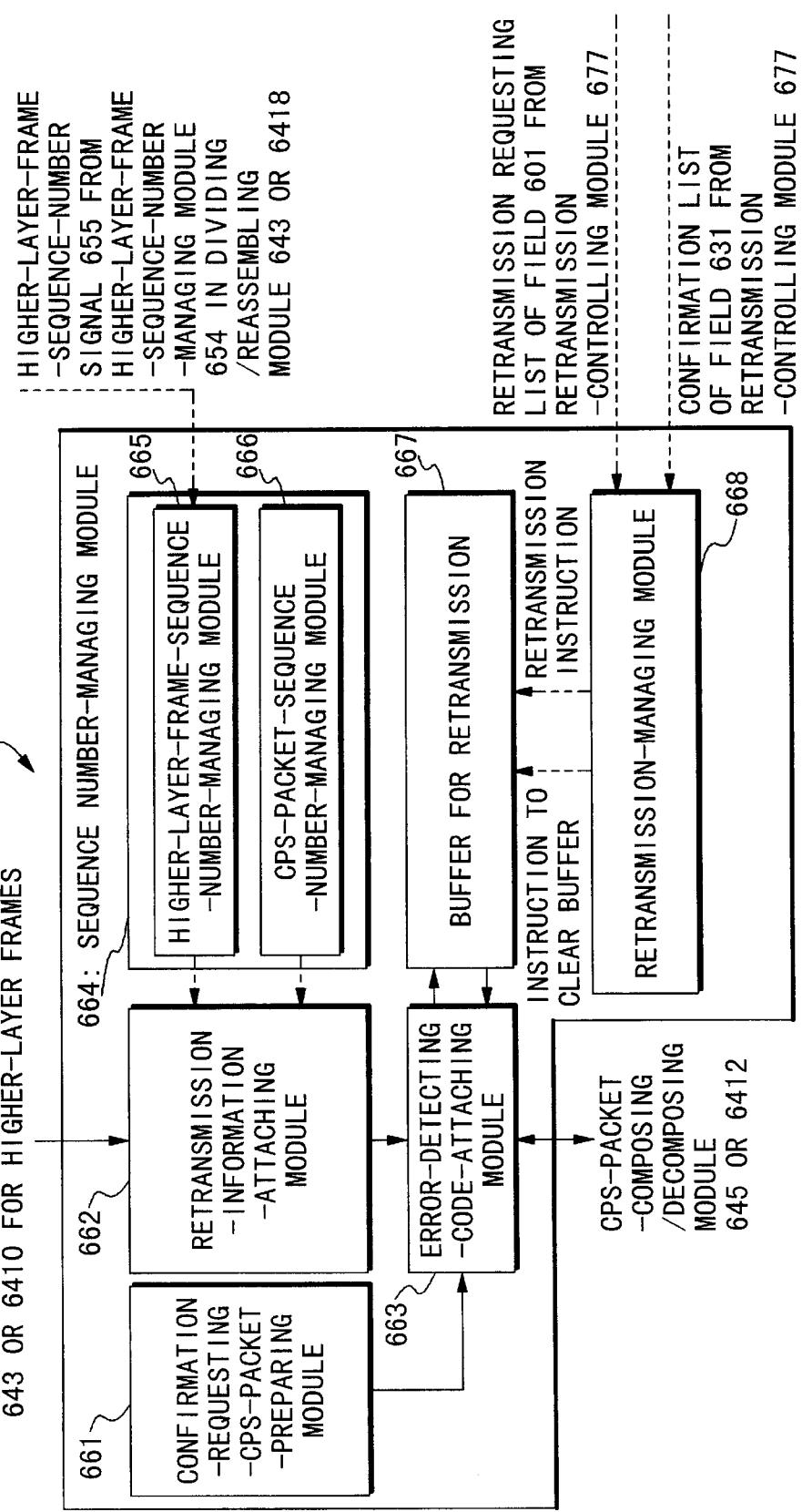
FIG. 16 shows a transmitting organization of the retransmitting-controlling module 644 according to the third embodiment.
Figure 17:
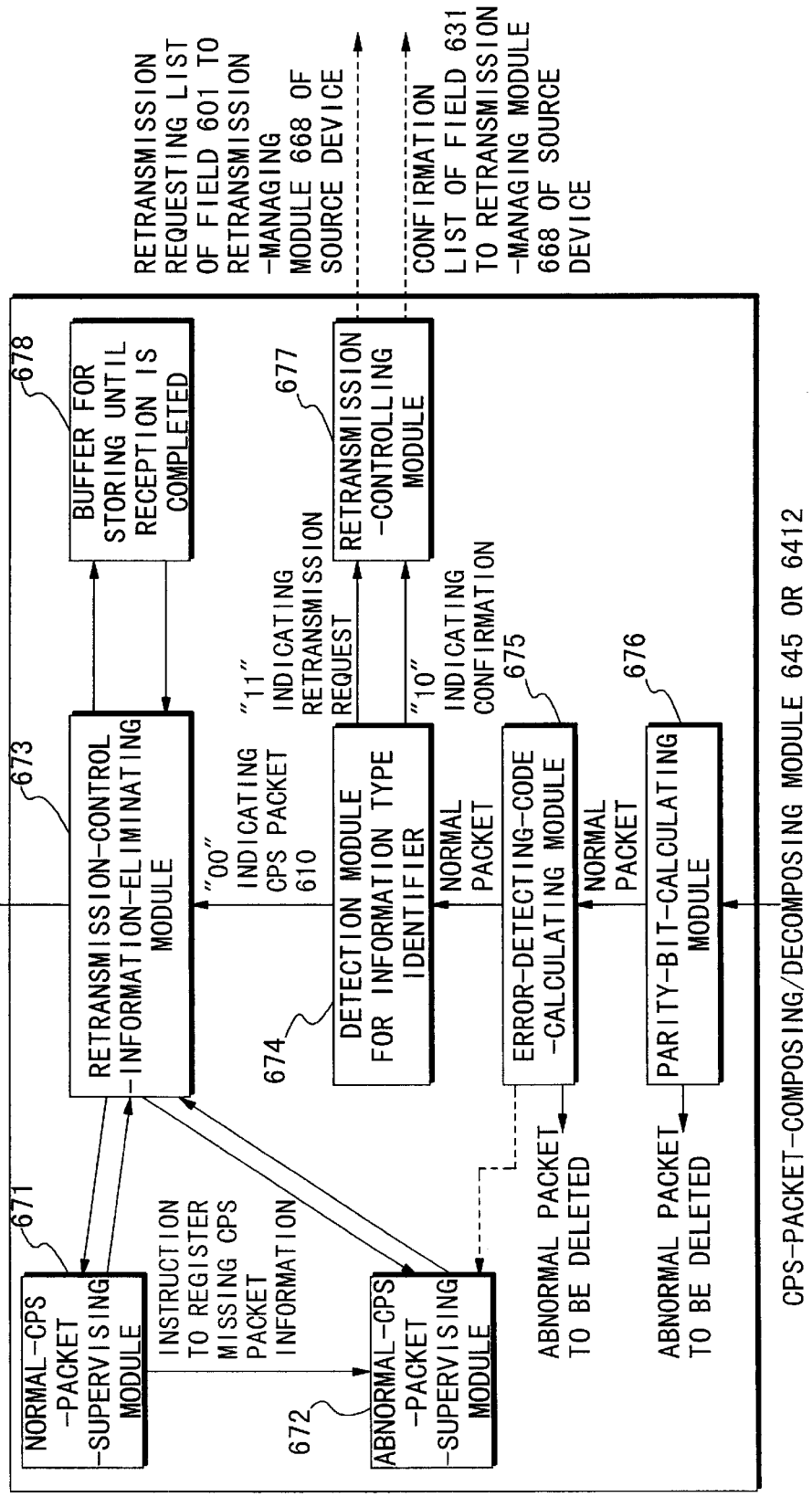
FIG. 17 shows a receiving organization of the retransmitting-controlling module 644 according to the third embodiment.

FIGS. 16 and 17 show in detail the retransmission-controlling a module 644. The retransmission-controlling module 644 comprises a transmitting organization shown in FIG. 16. In the transmitting organization, a sequence-number-managing module 664 includes a higher-layer-frame-sequence-number-managing module 665 and a CPS-packet-sequence-number-managing module 666.

When a CPS packet is supplied to a retransmission-information-attaching module 662 in the transmitting organization of the retransmission-controlling module 644, the higher-layer-frame-sequence-number-managing module 665 inquires of the higher-layer-frame-sequence-number-managing module 654 about the higher-layer frame sequence number corresponding to the supplied frame or segment. On the inquiry, the managing module 665 in the retransmission-controlling module 644 receives a higher-layer-frame-sequence-number signal 655 from the managing module 654 in the dividing/reassembling module 643, and then decides the higher-layer frame sequence number 617 in accordance with the received signal 655.

On the other hand, the CPS packet number-managing module 666 changes the CPS packet sequence number 618 when each frame or segment is received in the attaching module 662.

The higher-layer frame sequence number 617 and the CPS packet -sequence number 618 thus obtained are supplied to the retransmission-information-attaching module 662. The attaching module 662 attaches the sequence numbers 617 and 618 to each CPS packet received from the packet-processing module 652 or 653 in the dividing/reassembling module 643.

The transmitting organization of the dividing/reassembling module 643 also includes a confirmation-requesting-CPS-packet-preparing module 661 that prepares the CPS packets 620 for requesting confirmation at necessary occasions. That is, the CPS packets 620 are prepared periodically or in response to trigger signals independently of transmission of the higher-layer frame.

The transmitting organization of the dividing/reassembling module 643 also includes an error-detecting-code-attaching module 663 that attaches the error detecting code field 615 to each CPS packet. In addition, the module 663 attaches the retransmission control code field 613 to each of the CPS packets. In case of the CPS packet 610 for sending usual user data produced from a higher-layer frame, the attaching module 663 gives "00" for the information type identifier 616 in the retransmission control code field 613 (see FIG. 11).

In order to realize retransmission in response to the request, the CPS packets processed by the error-detecting-code-attaching module 663 are stored in a buffer 667. The buffer 667 for retransmission is connected with a retransmission-managing module 668. When the confirmation list data in the field 631 is supplied to the retransmission-managing module 668, the module 668 deletes the CPS packet or packets indicated in the list. When the retransmission requesting list data in the field 601 is supplied to the retransmission-managing module 668, the managing module 668 read out the CPS packet indicated in the list, and delivers the packet to the error-detecting-code-attaching module 663, whereby the packet, which could not be received normally, can be retransmitted.

3.2.4. Receiving Organization of Retransmission-Controlling Module 644

Furthermore, the retransmission-controlling module 644 comprises a receiving organization shown in FIG. 17. As shown in FIG. 17, the receiving organization includes a parity-bit-calculating module 676 for the retransmission control code field 613. The calculating module 676 calculates a number in the same manner for calculating the parity bit 619 with reference to the information type identifier 616, higher-layer frame sequence number 617, and CPS packet sequence number 618 in a CPS packet supplied from the CPS-packet-composing/decomposing module 645. Then, the calculating module 676 compares the parity bit 619 contained in the CPS packet with the newly calculated number. If they are not equal to each other, the calculating module 676 deletes the corresponding CPS packet.

On the other hand, if the calculated number is equal to the former parity bit 619, the corresponding CPS packet is transferred to an error-detecting-code-calculating module 675 for the user data field 614. The calculating module 675 calculates a code in the same manner for calculating the error detecting code field 615 with reference to the user data field 614. Then, the calculating module 675 compares the error detecting code contained in the field 615 of the CPS packet with the newly calculated code. If they are not equal to each other, the calculating module 675 provides an abnormal-CPS-packet-supervising module 672 with the retransmission control code in the field 613 of the corresponding CPS packet, and deletes this CPS packet.

On the other hand, when the calculated number is equal to the former error detecting code, the calculating module 675 provides a detection module 674 with the corresponding CPS packet. The detection module 674 detects the information type identifier 616 in the CPS packet. When the detection module 674 for the information type identifier detects that the identifier 616 is "00", identifying the CPS packet 610 for sending user data, the packet is transferred to a retransmission-control-information-eliminating module 673. However, if the identifier 616 is "11" or "10", identifying the retransmission requesting CPS packet 600 or the confirmation CPS packet 630, the packet is transferred to the retransmission-controlling module 677.

The retransmission-controlling module 677 extracts the retransmission requesting list field 601 and the confirmation list field 631 and transfers the data of these lists to the retransmission-managing module 668 shown in FIG. 16.

The usual user data CPS packet or packets, supplied to the retransmission-control-information-eliminating module 673, are stored in a buffer 678. The buffer 678 stores the CPS packet or packets until the reception is completed. In addition, the retransmission control code in it the field 613 of the CPS packet is supplied to a normal-CPS-packet-supervising module 671, which supervises the higher-layer frame sequence number 617 and CPS packet sequence number 618. More specifically, the packet supervising module 671 determines that the order of succession of the supplied higher-layer frame sequence number 617 and CPS packet sequence number 618 is regular or not. If a lost sequence number 617 and/or 618 is detected, the normal-CPS-packet-supervising module 671 informs the abnormal-CPS-packet-supervising module 672 of the lost number.

When it is decided by the normal CPS-packet supervising module 671 that one or more CPS packets originated from one higher-layer frame are normally received, the retransmission-control-information-eliminating module 673 reads out the CPS packet or the CPS packets from the buffer 678, and supplies the packet or packets to the dividing/reassembling module 643 for higher-layer frames.

Otherwise, the abnormal-CPS-packet-supervising module 672 instructs the CPS-packet-composing/decomposing module 645 to send the CPS packet 600 for requesting retransmission of the CPS packet 610, in which the user data field 614 has an error, or which is deleted for a communication trouble. More specifically, the lost sequence numbers 617 and 618 of the CPS packet are provided with the composing/decomposing module 645.

If the normal-CPS-packet-supervising module 671 determines that the CPS packet or packets are normally received, the supervising module 671 instructs the CPS-packet-composing/decomposing module 645 to send the CPS packet 630 for confirmation. In this case, the received sequence numbers 617 and 618 of the CPS packet are provided with the composing/decomposing module 645.

3.2.5. CPS-Packet-Composing/Decomposing Module 645

Figure 18:
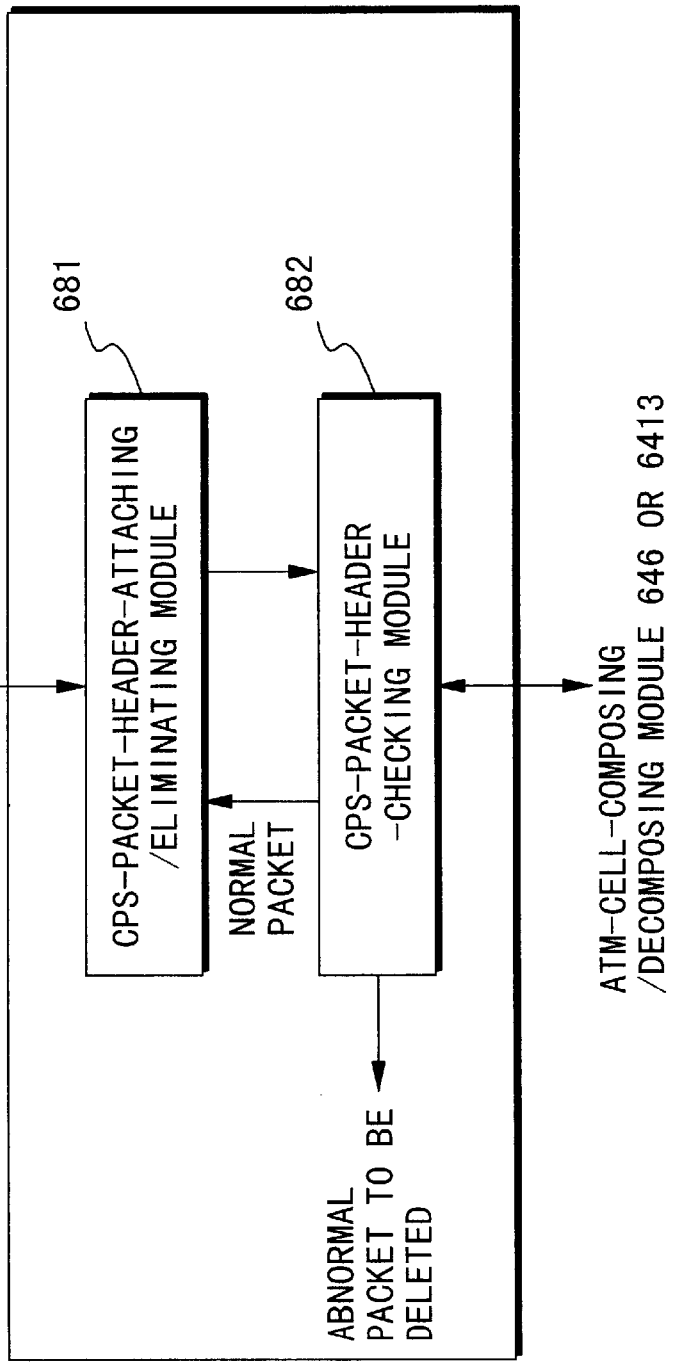
FIG. 18 shows a CPS-packet-composing/decomposing module 645 according to the third embodiment.

FIG. 18 shows in detail the CPS-packet-composing/decomposing module 645. The module 645 comprises a CPS-packet-header-attaching/eliminating module 681 and a CPS-packet-header-checking module 682. The CPS-packet-header-attaching/eliminating module 681 attaches the CPS packet header 612 to a CPS packet supplied from the retransmission-controlling module 644, and then transfers it to the CPS-packet-header-checking module 682. In addition, the CPS-packet-header-attaching/eliminating module 681 eliminates the CPS packet header 612 from each CPS packet supplied from the CPS-packet-header-checking module 682, and then transfers the packet to the retransmission-controlling module 644.

The CPS-packet-header-checking module 682 determines if the CPS packet header is normal or not. If the header is normal, the checking module permits the corresponding packet to transfer, but otherwise, the checking module deletes the packet.

3.2.6. ATM-Cell-Composing/Decomposing Module 646

Figure 19:
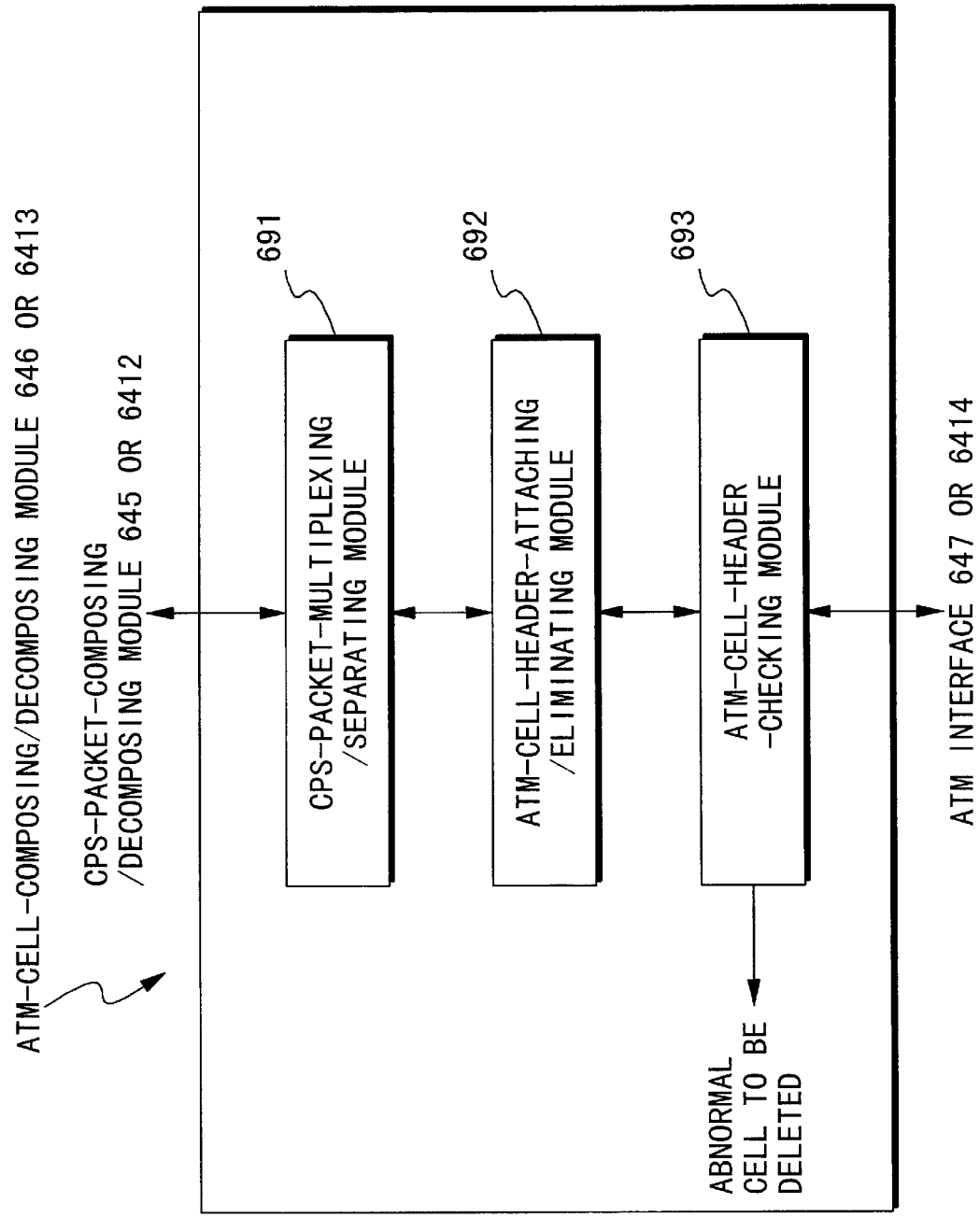
FIG. 19 shows a ATM-cell-composing/decomposing module 646 according to the third embodiment.

FIG. 19 shows in detail the ATM-cell-composing/decomposing module 646. The module 646 comprises a CPS-packet-multiplexing/separating module 691, an ATM-cell-header-attaching/eliminating module 692, and an ATM-cell-header-checking module 693. The CPS-packet-multiplexing/separating module 691 multiplexes the CPS packets supplied from the module 645 into payloads of ATM cells, and then transfers the ATM cells to the ATM-cell-header-attaching/eliminating module 692. Additionally, the module 691 extracts CPS packets from a payload of an ATM cell supplied from the module 692, and transfers the CPS packets to the CPS-packet-composing/decomposing module 645.

The ATM-cell-header-attaching/eliminating module 692 attaches an ATM cell header to the payload of the ATM cell supplied from the CPS-packet-multiplexing/separating module 691, and then transfers the cell to the ATM-cell-header-checking module 693. In addition, the ATM-cell-header-attaching/eliminating module 692 eliminates the ATM cell header from an ATM cell supplied from the ATM-cell-header-checking module 693, and then transfers the remaining payload of the ATM cell to the CPS-packet-multiplexing/separating module 691.

The ATM-cell-header-checking module 693 determines if the ATM cell header is normal or not. If the header is normal, the checking module 693 permits the corresponding ATM cell to transfer, but otherwise, the checking module 693 deletes the ATM cell.

3.3. Operations of Third Embodiment

3.3.1. Normal Communication Operation

When a higher-layer frame, prepared by the higher-layer processor 642, is supplied to the dividing/reassembling module 643, the higher-layer frame is divided into segments and then transferred to the retransmission-controlling module 644. Alternatively, the higher-layer frame is, as it is, transferred to the retransmission-controlling module 644 if it is short. The retransmission-controlling module 644 attaches the retransmission control code field 613 to the frame or segment. The CPS-packet-composing/decomposing module 645 also attaches the CPS packet header 612 to the frame or segment, thereby preparing a CPS packet.

Next, the ATM-cell-composing/decomposing module 646 transforms the CPS packet or packets to an ATM cell, and then transfers the ATM cell to the ATM interface 647, so that the ATM cells are transmitted to the ATM interface 6414 of the destination device 648. Then, the CPS-packet-composing/decomposing module 6412 extracts the CPS packet or packets from the ATM cell, and the ATM-cell-composing/decomposing module 6413 deletes the CPS packet header 612 from each CPS packet.

If the destination device 648 receives normally, the retransmission-controlling module 6411 of the destination device 648 recognizes the frame or segments produced from one higher-layer frame. The dividing/reassembling module 6410 reassembles the higher-layer frame based on the frame or segments. The reassembled higher-layer frame is transferred to the higher-layer processor 649.

In addition, when the frame or segments produced from one higher-layer frame are recognized, the normal-CPS-packet-supervising module 671 in retransmission-controlling module 6411 instructs the CPS-packet-composing/decomposing module 645 to send the CPS packet 630 for confirmation. In response to the reception of the CPS packet or packets 630 by the source device 641, the reception notice is provided with the retransmission-managing module 668 of the source device 641, whereby the CPS packets stored in the buffer 667 for retransmission are deleted. Consequently, if all the CPS packets corresponding to a higher-layer frame are transmitted from the source device 641 to the destination device 648 normally, the contents of the buffer 667 for retransmission is erased. Therefore, the source device 641 recognizes that the transmission has ended normally.

3.3.2. Operation When Communication Trouble (USER Data Error) Occurs

However, if the error-detecting-code-calculating module 675 in the retransmission-controlling module 6411 (FIG. 17) detects a contradiction of the user data field 614 and the error detecting code in the field 615, the higher-layer frame sequence number 617 and the CPS packet sequence number 618 of the CPS packet is provided with the abnormal-CPS-packet-supervising module 672, and the CPS packet is deleted by the retransmission-controlling module 6411.

The abnormal-CPS-packet-supervising module 672 then instructs the CPS-packet-composing/decomposing module 645 to send the retransmission requesting CPS packet 600 for the CPS packet, of which the error has be detected. In response, the destination device 648 transmits the CPS packet 600 to the source device 641, whereby the source device 641 makes the retransmission.

3.3.3. Operation When Communication Trouble (CPS Packet Losing) Occurs

When an ATM cell header is determined to be abnormal by the ATM-cell-header-checking module 693, the corresponding ATM cell is also deleted. Furthermore, when a CPS packet header 612 is determined to be abnormal by the CPS-packet-header-checking module 682 or a parity bit 619 is determined to be abnormal by the parity-bit-calculating module 676, the corresponding CPS packet is also deleted.

Consequently, in these cases, the CPS packet does not reach the error-detecting-code-calculating module 675, and the abnormal-CPS-packet-supervising module 672 cannot recognize the communication error quickly.

However, if a CPS packet is lost, the normal-CPS-packet-supervising module 671 determines that order of succession of the supplied higher-layer frame sequence number 617 and CPS packet sequence number 618 is irregular. Therefore, the normal-CPS-packet-supervising module 671 informs the abnormal-CPS-packet-supervising module 672 of the lost number, so that the CPS packet, to which a communication trouble occurred, can be specified. After that, the operation is similar to the above-mentioned error detection of the user data field 614. That is, the destination device 648 transmits the retransmission requesting CPS packet 600 to the source device 641, whereby the source device 641 makes the retransmission.

4. VARIATIONS AND MODIFICATIONS

Various variations and modifications of the present invention can be made without departing from the spirit or essential characteristics thereof. Therefore, the above embodiments are only examples and thus, the scope of invention is not restrictively defined by the above embodiments. The scope of the present invention is determined by the attached claims and rather than by the description. Moreover, all variations and modifications equivalent to the characteristics in the claims are included in the scope of the present invention.

For example, the above embodiments can be modified as described below.

The length of the restorative code field, the subfields therein, and the segments can be optional as long as the embodiments accomplish the advantages.

The functional structure shown in FIG. 2 or 5 can be realized by any of software and hardware.

It is possible to realize the functions of a high-rate data transmission (reception) processor, AAL type-2 converter, and AIF by different nodes in a LAN.

It is also possible to make a single unit transmission/reception node by combining the transmission node 26 with the reception node 32 in FIG. 2 or the transmission node 51 with the reception node 53 in FIG. 5.

In the embodiments, the SSCS in FIG. 1A executes the addition and elimination of dummy code fields, error correction, and segmentation and reassembly of data, and the SSCS in FIG. 4A executes the error correction and segmentation and reassembly of data. However, these functions can be carried out by one of layers higher than the SSCS.

Figure 7:
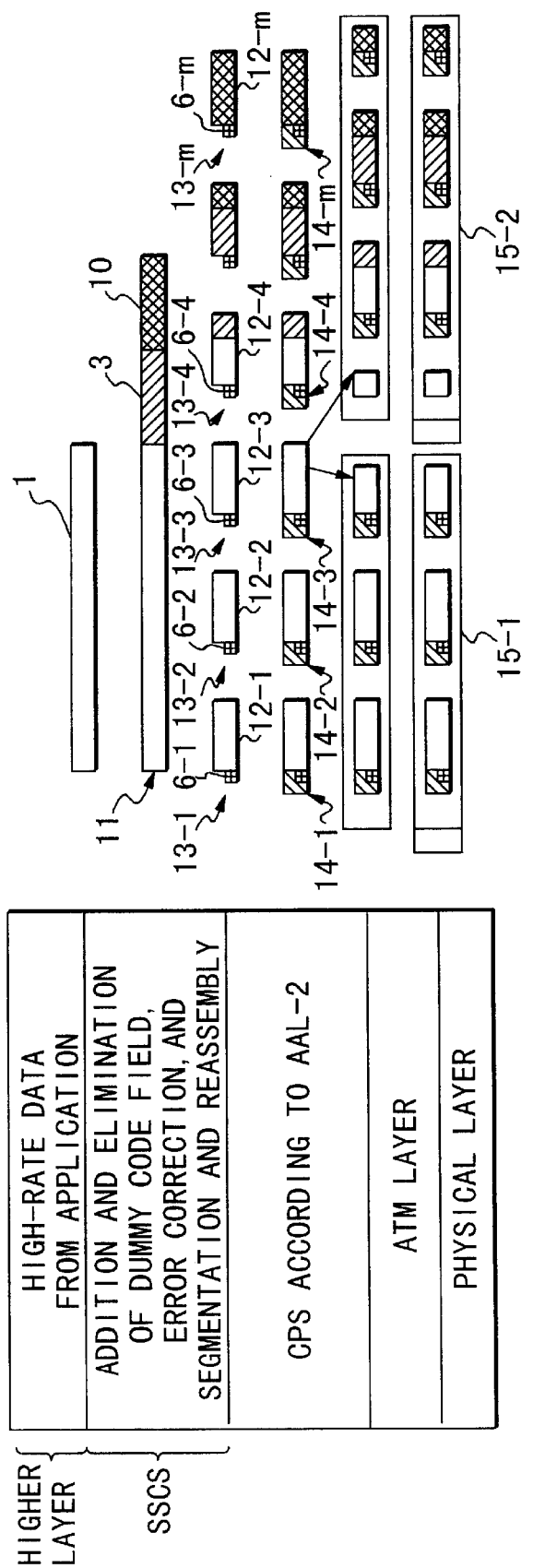
FIG. 7 is a conceptual diagram for explaining a variation of the data communication method of the first embodiment.

Furthermore, it is possible that the successive code attached by the SSCS be not contained in the payload of the CPS packet, rather it may be contained in the CPS packet header. FIG. 7 shows the data formats according to this variation. In FIG. 7, the same reference symbols are attached to elements that are common to FIG. 1A. In this variation, the location of the successive information is not limited as long as it is loaded in the CPS header, however, it is preferable to load the successive information into the UUI (User-to-User Indication) field of the CPS packet header.

Figure 20:
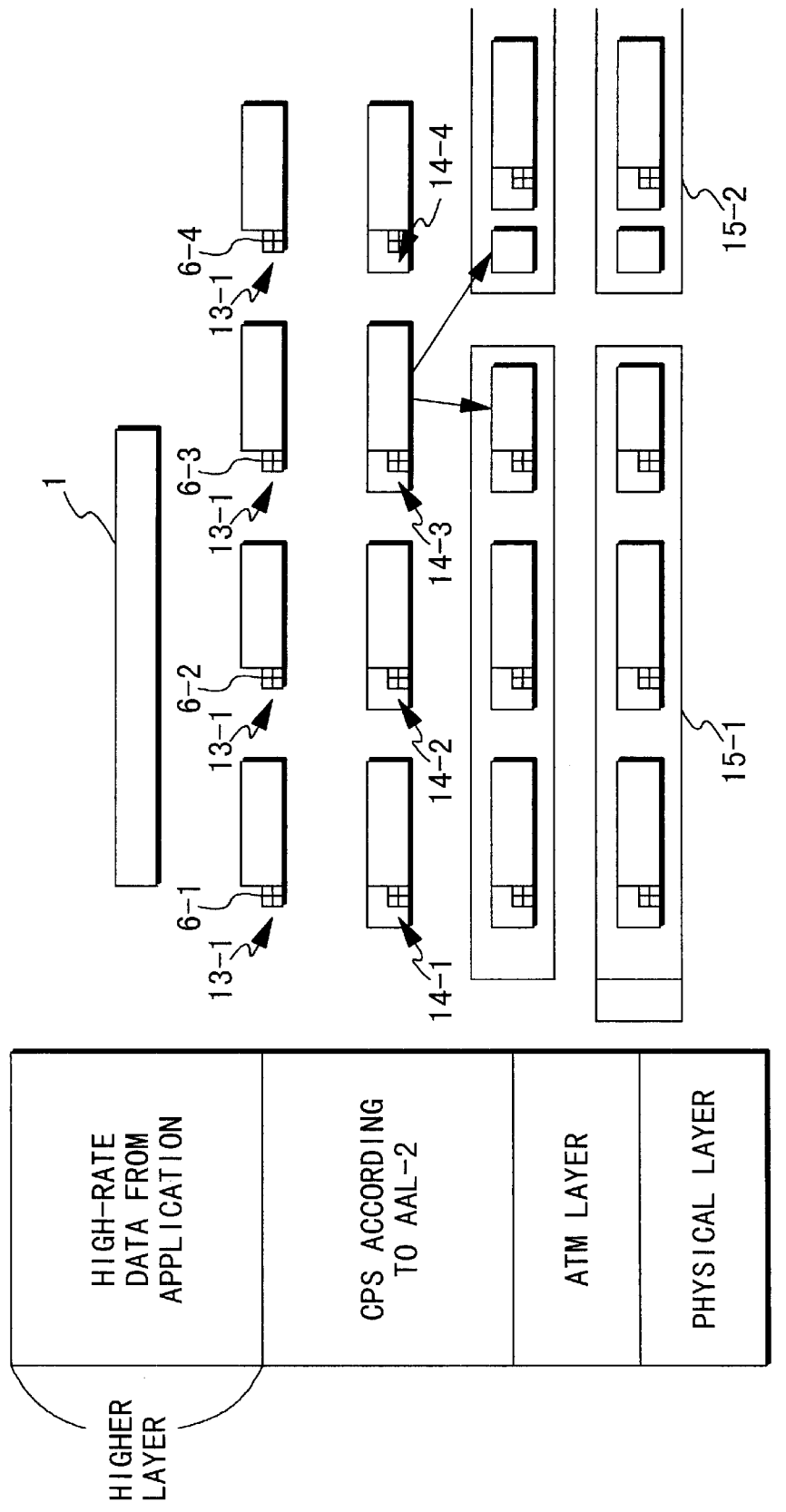
FIG. 20 is a diagram of a hierarchical structure of a high-rate data side including the AAL type 2 according to B-ISDN and showing data formats respectively corresponding to the layers used for a data communication method according to the third embodiment.
Figure 21:
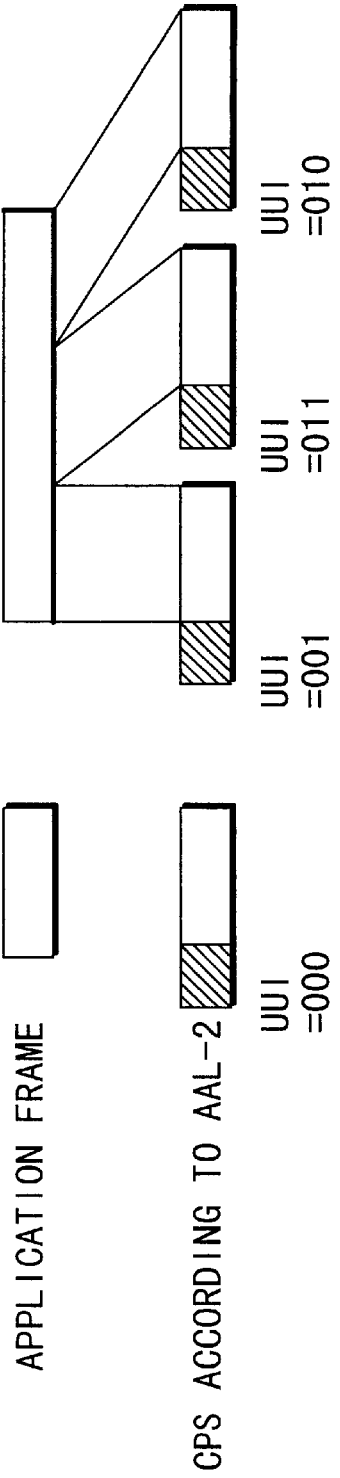
FIG. 21 is a code format example of three bit UUI in CPS packet header according to the third embodiment.

Moreover, FIG. 20 shows a further modification of the variation shown in FIG. 7. In FIG. 20, the same reference symbols are attached to elements that are common to FIG. 7. In this modification, the restorative code field 10 is excluded, and user data unit 1 is transferred between the higher layer and the CPS of the AAL type 2 converter directly. In the modification, it is possible to readily transmit data since the restorative code field 10 used for retransmission is excluded. This modification may be used for a higher-layer application, which does not make retransmission, according to, for example, unrestricted digital information transfer service. FIG. 21 exemplifies the code format of the UUI of the CPS packet header.

In the third embodiment, the ATM-cell-composing/decomposing module 646 loads the CPS packets into the payloads of the ATM cells. At this time, if a payload of an ATM cell contains a part of another CPS packet, only a part of the next CPS packet can be contained the ATM cell. In this case, if the ATM cell is lost, the source device 641 should retransmit a plurality of CPS packets corresponding to the ATM cell, so that the overhead time involved for retransmission will be increased. However, when the ATM cell is lost, it is preferable to retransmit a small number of CPS packets. Accordingly, the third embodiment can be modified as described below.

FIRST MODIFICATION OF THIRD EMBODIMENT

After a series of the CPS packets divided from one higher-layer frame are loaded into ATM cells, the ATM-cell-composing/decomposing module 646 informs the dividing/reassembling module 643 of a remaining space length of the payload of the last ATM cell. The dividing/reassembling module 643 determines a payload length of the top CPS packet, which is the beginning part of a next transferred higher-layer frame from the higher-layer processor 642, in order to load it into the remaining payload space of the last ATM cell. For example, the payload length Lc1 of the top CPS packet is determined to satisfy the next equation.

$$Lc1 = La - (Loa + Lor)$$

where La is the length of the remaining payload space of the ATM cell, Loa is the length of the overhead for AAL type 2 protocol, and Lor is the length of the overhead for retransmission.

The dividing/reassembling module 643 then determines the payload length Lc2 (expressed by octets) of the succeeding CPS packets, which should be prepared from the same higher-layer frame, to a predetermined length to satisfy the next equation.

$$Lc2 = 48 - (Loa + Lor)$$

where 48 (octets) is the entire length of the payloads of ATM cells.

The divided CPS packets are successively loaded into the payloads of the ATM cells. Except for the top and end CPS packets prepared from one higher-layer frame, it is not allowed to multiplex each of the CPS packets with another CPS packet from another connected terminal in one ATM cell payload.

In this modification, each of the CPS packets (except for the top and end CPS packets prepared from one higher-layer frame) occupies one ATM cell payload. Therefore, although one ATM cell is lost, it is enough to retransmit only a single CPS packet corresponding to the lost ATM cell.

SECOND MODIFICATION OF THIRD EMBODIMENT

The ATM-cell-composing/decomposing module 646 always informs the dividing/reassembling module 643 of the remaining payload length of the last ATM cell. On the basis of the information, the dividing/reassembling module 643 always determines a payload length of the next CPS packet in order to load it into the remaining payload space of the last ATM cell. Namely, the payload length Lc of the top CPS packets is determined to satisfy the next equation.

$$Lc = La - (Loa + Lor)$$

where La is the length of the remaining payload space of the ATM cell, Loa is the length of the overhead for AAL type 2 protocol, and Lor is the length of the overhead for retransmission.

In this modification, it is allowed to multiplex each of the CPS packet with another CPS packet only from another connected terminal in one ATM cell payload. Since succesive CPS packtes divided from a single higher-layer frame are not contained in one ATM cell, it is enough to retransmit only a single CPS packet corresponding to a lost ATM cell.

THIRD MODIFICATION OF THIRD EMBODIMENT

The ATM-cell-composing/decomposing module 646 always pads payloads of the ATM cells (puts unnecessary data into the payloads of the ATM cells). The dividing/reassembling module 643 always divides the long higher-layer frames into CPS packets in such a manner that the payload length Lc (expressed by octets) of the succeeding CPS packets is a predetermined length to satisfy the next equation.

$$Lc = 48 - (Loa + Lor)$$

where 48 (octets) is the entire length of the payloads of ATM cells, Loa is the length of the overhead for AAL type 2 protocol, and Lor is the length of the overhead for retransmission. The divided CPS packets are successively loaded into the payloads of the ATM cells, respectively while the ATM cell payloads are padded. It is also not allowed to multiplex each of the CPS packets with another CPS packet from another connected terminal in one ATM cell payload.

In this modification, each of the CPS packets occupies one ATM cell payload. Therefore, although one ATM cell is lost, it is enough to retransmit only a single CPS packet corresponding to the lost ATM cell.

What is claimed is:

1. A data communication method for transmitting high-rate user data, having a length exceeding a predetermined length, using AAL type 2 protocol, the AAL type 2 protocol originally capable of transmitting user data units to an ATM network, each of the user data units having a length at least one of shorter than and equal to the predetermined length, and being transferred from a layer that is higher than the AAL type 2 protocol, the AAL type 2 protocol capable of extracting data from packets received from the ATM network and transferring the data to the higher layer, a sublayer being situated between the higher layer and the AAL type 2 protocol, the method comprising the steps of:

attaching a restorative code to a user data unit using the sublayer, thereby preparing a data unit, the restorative code being used to restore the user data unit, the restorative code being limited to no more than three different fields and containing at least one of an error detection code and error correcting code for checking the user data unit;

dividing the data unit into segments having a length equal to or less than the predetermined length;

attaching successive codes to each of the segments, respectively, each of the successive codes indicating whether a successive segment follows a corresponding segment;

transferring the segments with the successive codes to the AAL type 2 protocol in order to load the segments with the successive codes into packets;

reassembling the data unit from the segments received from the AAL type 2 protocol in accordance with the successive codes attached to the segments; and restoring the user data unit in accordance with the restorative code in the data unit and transferring the user data unit to the higher layer.

2. A data communication method according to claim 1, wherein the sublayer divides the data unit into the segments, attaches the successive codes to each of the segments, respectively, and transfers the segments with the successive codes to the AAL type 2 protocol in order to load the segments with the successive codes into packets when the sublayer is used for transmission, and the sublayer reassembles the data unit from the segments in accordance with the successive codes extracted from the packets when the sublayer is used for reception.

3. A communication method according to claim 2, wherein the restorative code comprises a length indicator indicating a length of the user data unit and at least one of an error detection code and an error correction code for checking both the user data unit and the length indicator.

4. A communication method according to claim 2, wherein the sublayer attaches a dummy code and the restorative code to the user data unit, thereby preparing the data unit when the sublayer is used for transmission, a length of the dummy code being determined according to the user data unit, the restorative code being used for restoring the user data unit and the dummy code, and the sublayer restores the user data unit in accordance with the restorative code in the reassembled data unit and transfers the user data unit to the higher layer, the restorative code including a length indicator indicating a length of the user data unit and at least one of an error detection code and an error correction code for checking all of the user data unit, dummy code and length indicator.

5. A communication method according to claim 4, wherein a length of the dummy code is an integral multiple of the predetermined length.

6. A communication method as in any one of claims 1 to 4, wherein a last segment among the segments prepared from the data unit has a length less than the predetermined length.

7. A communication device for transferring a data unit to an AAL type 2 converter, the AAL type 2 converter capable of transmitting user data units to an ATM network, each of the user data units having a length at least one of shorter than and equal to a predetermined length and being transferred from a layer that is higher than the AAL type 2 converter, the communication device comprising:

a transmission processor programmed to: attach a restorative code to a user data unit using the sublayer, thereby preparing a data unit, the restorative code being used to restore the user data unit, the restorative code being limited to no more than three different fields and containing at least one of an error detection code and an error correcting code for checking the user data unit; divide the data unit into segments having a length at least one of equal to and less than the predetermined length; attach successive codes to each of the segments, respectively, each of the successive codes indicating whether a successive segment follows a corresponding segment; and transfer the segments with the successive codes to the AAL type 2 converter in order to load the segments with the successive codes into packets.

8. A communication device according to claim 7, wherein the transmission processor divides the data unit into the segments, attaches the successive codes to each of the segments, respectively, and transfers the segments with the successive codes to the AAL type 2 converter in order to load the segments with the successive codes into packets.

9. A communication device according to claim 8, wherein the restorative code includes a length indicator indicating a length of the user data unit and at least one of an error detection code and an error correction code for checking both the user data unit and the length indicator.

10. A communication device according to claim 8, wherein the transmission processor is further programmed to attach a dummy code and the restorative code to the user data unit, thereby preparing the data unit, a length of the dummy code being determined according to the user data unit, the restorative code being used for restoring the user data unit and the dummy code, the restorative code including a length indicator indicating a length of the user data unit and at least one of an error detection code and an error correction code for checking all of the user data unit, dummy code and length indicator.

11. A communication device according to claim 10, wherein the length of the dummy code is adjusted so that the length of the data unit is an integral multiple of the predetermined length.

12. A communication device as in any one of claims 7 to 10, wherein a last segment among the segments prepared from the data unit has a length less than the predetermined length.

13. A communication device using AAL type 2 protocol, the AAL type 2 protocol extracting data from packets received from an ATM network and transferring the data to a layer higher than the AAL type 2 protocol, the communication device restoring a high rate user data unit from the data extracted by the AAL type 2 protocol and transferring the user data unit to the higher layer, the communication device comprising:

a reception processor programmed to reassemble a data unit from segments extracted from the packets in accordance with successive codes attached to each of the segments, respectively, and restore a user data unit in accordance with a restorative code in the data unit, the restorative code being limited to no more than three different fields and containing at least one of an error detection code and an error correcting code for checking the user data unit, each of the successive codes indicating whether a successive segment follows a corresponding segment.

14. A communication device according to claim 13, wherein the reception processor reassembles a data unit from segments extracted from the packets in accordance with successive codes extracted from headers of the packets.

15. A communication device according to claim 14, wherein the restorative code includes a length indicator indicating a length of the user data unit and at least one of an error detection code and an error correction code for checking both the user data unit and length indicator.

16. A communication device according to claim 14, wherein the data unit contains a dummy code attached by a source device, the restorative code including a length indicator indicating a length of the user data unit and at least one of an error detection code and an error correction code for checking all of the user data unit, dummy code and length indicator, and the reception processor further programmed to reassemble the data unit in accordance with the length indicator.

17. A communication device according to claim 16, wherein a last segment among the segments prepared from the data unit has a length less than the predetermined length.

18. A communication device as in any one of claims 13 to 17, wherein the reception processor is further programmed to conduct a detection of errors in the user data unit using the error correction code, and transfer information based on the detection to the higher layer.

19. A communication device as in any one of claims 13 to 17, wherein the reception processor is further programmed to conduct a detection of errors in the user data unit using the error correction code, and transfer information based on the detection, without the user data unit, to the higher layer if the reception processor detects an error in the user data unit.

20. A communication device as in any one of claims 13 to 17, wherein the reception processor is further programmed to conduct a detect ion of errors in the user data unit using the error correction code, and transfer the user data unit to the higher layer if the reception processor detects no errors in the user data unit.

21. A data communication method having a lower layer, the lower layer capable of transmitting user data units to a network, each of the user data units having a length at least one of shorter than and equal to a predetermined length and being transferred from a layer that is higher than the lower layer, the lower layer originally capable of extracting data from packets received from the network and transferring the data to the higher layer, the method comprising the steps of:
    providing a sublayer between the higher layer and the lower layer;
    attaching a restorative code to a user data unit using the sublayer, thereby preparing a data unit, the restorative code for restoring the user data unit, the restorative code containing at least one off an error detection code and an error correcting code for checking the user data unit and being limited to no more than three different fields;
    dividing the data unit into segments having a length at least one of equal to and less than the predetermined length; attaching successive codes to each of the segments, respectively, each of the successive codes indicating whether a successive segment is following the corresponding segment; transferring the segments with the successive codes to the lower layer to load the segments with the successive codes into packets; transferring the segments with the successive codes from the lower layer to the sublayer; reassembling the data unit from the segments received from the lower layer in accordance with the successive codes attached to the segments; and restoring the user data unit in accordance with the restorative code in the data unit and transferring the user data unit to the higher layer.

22. A data communication method comprising the steps of:
    dividing a data unit into a plurality of segments;
    attaching identifiers to the segments;
    transmitting the segments;
    receiving the segments;
    determining whether all of the segments for reassembling the data unit are received in accordance with the identifiers;
    reassembling the data unit when the determination is affirmative; and
    limiting functions of a service specific convergence sublayer to addition and elimination of dummy code fields in the data unit, error correction of the data unit, and segmentation and reassembly of the data unit.

23. A data communication method according to claim 22, wherein the identifiers are numbers which are changed cyclicly.

24. A data communication method according to claim 23, further comprising the steps of determining whether the identifiers of the received segments change cyclically and outputting a retransmission requesting signal indicating the identifier if the determination of whether the identifiers of the received segments change cyclically is negative.

25. A data communication method according to claim 24, wherein each of the identifiers comprises a first value which changes for each segment and a second value which changes for each user data unit.

26. A data communication method comprising the steps of:
    dividing a data unit into a plurality of segments;
    attaching identifiers to the segments;
    transmitting the segments;
    receiving the segments;
    determining if each of the received segments is normal in accordance with contents of the segments;
    determining if a segment is lost in accordance with the identifiers attached to the segments if the received segments are normal;
    outputting a retransmission requesting signal indicating at least one of an identifier of at least one abnormal segment if at least one received segment is not normal, and an identifier of at least one lost segment if at least one segment is lost; and
    limiting functions of a service specific convergence sublayer to addition and elimination of dummy code fields in the data unit, error correction of the data unit, and segmentation and reassembly of the data unit.

27. A data communication method according to claim 23, further comprising limiting the data unit to a user data unit, a dummy field code, and at least one of a length indicator field and an error correcting code field.

28. A data communication method according to claim 27, further comprising excluding the length indicator field from the data unit.

29. A data communication method according to claim 23, further comprising excluding a user-to-user indication field and a common part indicator field from the data unit.

30. A data communication method according to claim 26, further comprising limiting the data unit to a user data unit, a dummy field code, and at least one of a length indicator field and an error correcting code field.

31. A data communication method according to claim 30, further comprising excluding the length indicator field from the data unit.

32. A data communication method according to claim 26, further comprising excluding a user-to-user indication field and a common part indicator field from the data unit.

33. A data communication method according to claim 1, further comprising limiting the fields of the restorative code to a length indicator indicating a length of the user data unit and at least one of an error detection code and an error correction code for checking the user data unit and the length indicator.

34. A data communication method according to claim 1, further comprising limiting the fields of the restorative code to only at least one of the error detection code and the error correction code.

35. A data communication method according to claim 34, further comprising limiting the fields of the restorative code to only one of the error detection code and the error correction code.

36. A data communication method according to claim 7, further comprising limiting the fields of the restorative code to a length indicator indicating a length of the user data unit and at least one of an error detection code and an error correction code for checking the user data unit and the length indicator.

37. A data communication method according to claim 7, further comprising limiting the fields of the restorative code to only at least one of the error detection code and the error correction code.

38. A data communication method according to claim 37, further comprising limiting the fields of the restorative code to only one of the error detection code and the error correction code.

39. A data communication method according to claim 13, further comprising limiting the fields of the restorative code to a length indicator indicating a length of the user data unit and at least one of an error detection code and an error correction code for checking the user data unit and the length indicator.

40. A data communication method according to claim 13, further comprising limiting the fields of the restorative code to only at least one of the error detection code and the error correction code.

41. A data communication method according to claim 40, further comprising limiting the fields of the restorative code to only one of the error detection code and the error correction code.

42. A data communication method according to claim 21, further comprising limiting the fields of the restorative code to a length indicator indicating a length of the user data unit and at least one of an error detection code and an error correction code for checking the user data unit and the length indicator.

43. A data communication method according to claim 21, further comprising limiting the fields of the restorative code to only at least one of the error detection code and the error correction code.

44. A data communication method according to claim 43, further comprising limiting the fields of the restorative code to only one of the error detection code and the error correction code.

* * * * *

UNITED STATES PATENT AND TRADEMARK OFFICE
CERTIFICATE OF CORRECTION

PATENT NO. : 6,574,226 B1
DATED : June 3, 2003
INVENTOR(S) : Masatomo Nakano et al.

It is certified that error appears in the above-identified patent and that said Letters Patent is hereby corrected as shown below:

<u>Title page,</u>
Insert Item
-- [30] Foreign Application Priority Data
JP     8-348,899     12/1996 --.

Signed and Sealed this

Third Day of May, 2005

JON W. DUDAS
*Director of the United States Patent and Trademark Office*